(12) United States Patent
Bentley et al.

(10) Patent No.: US 12,194,340 B2
(45) Date of Patent: *Jan. 14, 2025

(54) SYSTEMS AND METHODS FOR MEASURING AND ANALYZING THE MOTION OF A SWING AND MATCHING THE MOTION OF A SWING TO OPTIMIZED SWING EQUIPMENT

(71) Applicant: TourBuilt, LLC, Littleton, CO (US)

(72) Inventors: Michael Bentley, Carlsbad, CA (US); Brett Juhas, San Diego, CA (US)

(73) Assignee: TourBuilt, LLC, Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,021

(22) Filed: May 5, 2023

(65) Prior Publication Data

US 2023/0271057 A1 Aug. 31, 2023

Related U.S. Application Data

(63) Continuation of application No. 18/163,838, filed on Feb. 2, 2023.
(Continued)

(51) Int. Cl.
*A63B 24/00* (2006.01)
*A63B 60/46* (2015.01)
(Continued)

(52) U.S. Cl.
CPC ...... *A63B 24/0003* (2013.01); *A63B 24/0062* (2013.01); *A63B 60/46* (2015.10);
(Continued)

(58) Field of Classification Search
CPC . A63B 24/0003; A63B 24/0062; A63B 60/46; A63B 71/0622; A63B 2071/0647;
(Continued)

(56) References Cited

U.S. PATENT DOCUMENTS 5,233,544 A * 8/1993 Kobayashi ............. A63B 24/00
473/223
5,332,211 A 7/1994 Rife et al.
(Continued)

FOREIGN PATENT DOCUMENTS

AU 2011293130 A1 4/2013
AU 2011313952 A1 6/2013
(Continued)

OTHER PUBLICATIONS

Co-pending U.S. Appl. No. 18/163,838, inventors Michael; Bentley et al., filed Feb. 2, 2023.
(Continued)

*Primary Examiner* — Marrit Eyassu
(74) *Attorney, Agent, or Firm* — Cooley LLP

(57) ABSTRACT

A system and method for analyzing the swing motion of sporting equipment, for example, a golf club, including at least one or more inertial acceleration sensors, one or more gyrometric sensors, a data acquiring unit, a core microcontroller, and a Bluetooth radio. The motion detecting unit detects at least one motion of the swing. Particularly, the sensors and data acquiring unit calculates swing information using the acquired detection data to match a user's swing motion to optimized equipment. Particularly, the data acquiring unit acquires detection data from the sensor(s) and forwards such data to a computing device or server having stored information that matches the swing motion to an optimized swing device.

21 Claims, 7 Drawing Sheets

Related U.S. Application Data

(60) Provisional application No. 63/306,309, filed on Feb. 3, 2022.

(51) Int. Cl.
*A63B 71/06* (2006.01)
*A63B 102/32* (2015.01)
*G01C 21/16* (2006.01)

(52) U.S. Cl.
CPC .......... *A63B 71/0622* (2013.01); *G01C 21/16* (2013.01); *A63B 2071/0647* (2013.01); *A63B 2102/32* (2015.10); *A63B 2220/40* (2013.01); *A63B 2225/50* (2013.01)

(58) Field of Classification Search
CPC ............ A63B 2102/32; A63B 2220/40; A63B 2225/50; G01C 21/16
USPC ........................................................ 73/493
See application file for complete search history.

(56) References Cited

U.S. PATENT DOCUMENTS

| | | |
|---|---|---|
| 7,264,554 B2 | 9/2007 | Bentley |
| 8,465,376 B2 | 6/2013 | Bentley |
| 8,523,696 B2 * | 9/2013 | Kamino ............. A63B 69/3608 473/131 |
| 8,613,676 B2 | 12/2013 | Bentley |
| 8,616,989 B2 | 12/2013 | Bentley |
| 8,827,824 B2 | 9/2014 | Bentley et al. |
| 8,941,723 B2 | 1/2015 | Bentley et al. |
| 9,028,337 B2 | 5/2015 | Bentley |
| 9,033,810 B2 | 5/2015 | Bentley |
| 9,076,041 B2 | 7/2015 | Bentley et al. |
| 9,211,439 B1 | 12/2015 | Pedenko et al. |
| 9,247,212 B2 | 1/2016 | Bose et al. |
| 9,261,526 B2 | 2/2016 | Bentley et al. |
| 9,320,957 B2 | 4/2016 | Bentley |
| 9,349,049 B2 | 5/2016 | Bentley et al. |
| 9,361,522 B2 | 6/2016 | Bentley et al. |
| 9,401,178 B2 | 7/2016 | Bentley et al. |
| 9,418,705 B2 | 8/2016 | Kaps et al. |
| 9,604,142 B2 | 3/2017 | Bentley et al. |
| 9,607,652 B2 | 3/2017 | Bose et al. |
| 9,622,361 B2 | 4/2017 | Bentley et al. |
| 9,643,049 B2 | 5/2017 | Bentley et al. |
| 9,770,658 B2 | 9/2017 | Bentley |
| 9,814,935 B2 | 11/2017 | Bentley et al. |
| 9,866,827 B2 | 1/2018 | Bose et al. |
| 10,109,061 B2 | 10/2018 | Bose et al. |
| 10,124,230 B2 | 11/2018 | Thornbrue et al. |
| 10,232,225 B1 | 3/2019 | Oberc et al. |
| 10,254,139 B2 | 4/2019 | Martin et al. |
| 10,265,602 B2 | 4/2019 | Haas et al. |
| 10,339,978 B2 | 7/2019 | Bose et al. |
| 10,406,399 B2 | 9/2019 | Bentley et al. |
| 10,456,653 B2 | 10/2019 | Thornbrue et al. |
| 10,456,676 B2 | 10/2019 | Bentley |
| 10,463,958 B2 | 11/2019 | Bentley |
| 10,569,134 B2 | 2/2020 | Vermilyea et al. |
| 10,576,373 B2 | 3/2020 | Bentley |
| 10,607,349 B2 | 3/2020 | Bose et al. |
| 10,716,989 B2 | 7/2020 | Thornbrue et al. |
| 10,786,728 B2 | 9/2020 | Haas et al. |
| 10,974,121 B2 | 4/2021 | Thornbrue et al. |
| 11,000,765 B2 | 5/2021 | Bentley |
| 11,033,776 B2 | 6/2021 | Vermilyea et al. |
| 11,400,362 B2 | 8/2022 | Haas et al. |
| 2005/0288119 A1 * | 12/2005 | Wang ..................... A63B 69/36 473/223 |
| 2011/0305369 A1 * | 12/2011 | Bentley ................ A61B 5/1128 340/572.1 |
| 2014/0135139 A1 * | 5/2014 | Shibuya ............. G09B 19/0038 473/223 |
| 2015/0057111 A1 | 2/2015 | Tremblay-Munger et al. |
| 2015/0068274 A1 | 3/2015 | Peters et al. |
| 2016/0175673 A1 | 6/2016 | Shibuya et al. |
| 2017/0001072 A1 * | 1/2017 | Brekke .................. G16H 20/30 |
| 2018/0272209 A1 * | 9/2018 | Shibuya .............. A63B 69/3632 |
| 2019/0076710 A1 | 3/2019 | Ding et al. |
| 2019/0209909 A1 | 7/2019 | Thornbrue et al. |
| 2020/0139214 A1 | 5/2020 | Saegusa |
| 2020/0230482 A1 | 7/2020 | Thornbrue et al. |
| 2020/0306610 A1 | 10/2020 | Kodaira et al. |
| 2021/0146235 A1 | 5/2021 | Haas et al. |
| 2021/0228963 A1 | 7/2021 | Thornbrue et al. |
| 2021/0299516 A1 | 9/2021 | Vermilyea et al. |
| 2022/0001236 A1 * | 1/2022 | Mooney .................. G06F 18/00 |
| 2022/0249909 A1 | 8/2022 | Bentley et al. |
| 2022/0370893 A1 | 11/2022 | Haas et al. |
| 2023/0149789 A1 * | 5/2023 | Root ...................... A63B 60/16 473/223 |
| 2024/0042276 A1 | 2/2024 | Bentley |

FOREIGN PATENT DOCUMENTS

| | | | |
|---|---|---|---|
| AU | 2012345966 A1 | 7/2014 | |
| AU | 2013209683 A1 | 9/2014 | |
| AU | 2015249884 A1 | 1/2016 | |
| AU | 2016204553 A1 | 7/2016 | |
| AU | 2016293613 A1 | 3/2018 | |
| CA | 2812734 A1 | 3/2012 | |
| CA | 2817875 A1 | 4/2012 | |
| CA | 2862209 A1 | 6/2013 | |
| CA | 2917542 A1 | 10/2015 | |
| CA | 3031040 A1 | 1/2017 | |
| CN | 106464848 A | 2/2017 | |
| EP | 1846115 A2 | 10/2007 | |
| EP | 2609568 A2 | 7/2013 | |
| EP | 2628101 A1 | 8/2013 | |
| EP | 2785424 A1 | 10/2014 | |
| EP | 3017598 A1 | 5/2016 | |
| EP | 3323084 A1 | 5/2018 | |
| KR | 20070095407 A | 9/2007 | |
| KR | 20190096735 A * | 8/2019 | |
| WO | WO-2006081395 A2 | 8/2006 | |
| WO | WO-2012027726 A2 | 3/2012 | |
| WO | WO-2012051054 A1 | 4/2012 | |
| WO | WO-2012125878 A2 | 9/2012 | |
| WO | WO-2013082201 A1 | 6/2013 | |
| WO | WO-2014085744 A1 | 6/2014 | |
| WO | WO-2015164389 A1 | 10/2015 | |
| WO | WO-2016081778 A1 * | 5/2016 | ............. A63F 13/00 |
| WO | WO-2017011811 A1 | 1/2017 | |
| WO | WO-2017011814 A1 | 1/2017 | |
| WO | WO-2017011818 A1 | 1/2017 | |
| WO | WO-2017192379 A1 * | 11/2017 | ......... A63B 24/0003 |
| WO | WO-2017218962 A1 | 12/2017 | |
| WO | WO-2018204538 A1 | 11/2018 | |
| WO | WO-2018217674 A1 | 11/2018 | |
| WO | WO-2023150715 A2 | 8/2023 | |

OTHER PUBLICATIONS

Co-pending U.S. Appl. No. 18/360,432, inventor Bentley; Michael, filed Jul. 27, 2023.
International Search Report and Written Opinion for PCT Application No. PCT/US2023/061987 dated Jul. 20, 2023, 11 pages.
Non-Final Office Action for U.S. Appl. No. 18/360,432 dated Dec. 1, 2023, 20 pages.
Final Office Action for U.S. Appl. No. 18/360,432 mailed Sep. 16, 2024, 24 pages.
International Preliminary Report on Patentability for International Application No. PCT/US2023/061987 mailed Aug. 15, 2024, 8 pages.

* cited by examiner

ADDITIONAL FEATURES:

- ACCEL OFFSET CORRECTION
- LOW-G ACCEL SATURATION CORRECTION
- IDENTIFY SWING SIGNATURE KEY EVENTS
- TIMING AND VELOCITY RATIO CALCULATION
- SHAFT DEFLECTION SIMULATIONS

FIG. 2

DATA PROCESSING OVERVIEW

- INVALID SCREENER
  - Relies on raw gyro and accelerometer data to identify swing signature and impact with ball.
- QUATERNION ROTATION
  - IMU data expressed in rotating frame, need to determine quaternion rotations for transformation.
- GRAVITY CORRECTION
  - Accel data effected by gravitational vector, need to remove this artifact.
- GLOBAL FRAME TRANSFORMATION
  - Need to express swing data in a non-rotating frame for kinematic analysis.
- PLANAR PROJECTION
  - Currently using a 2D swing model. Projection of swing onto best fit plane.
- SWING DYNAMICS MODEL
  - Use model to extract golfer applied torque and force during swing.
- FREQUENCY ANALYSIS
  - Analyze torque profile to determine erratic-ness and consistency of motion. Analysis to golfer Groove Number Score.
- SHAFT MODEL
  - Use applied torque and forces to drive shaft bending model. Determine shaft deflection profile.

FIG. 3

PLOTTING DATA OVERVIEW

- GYRO PLOT
    - Displays raw gyro data (rotating sensor frame).
    - Swing signature key-point are identified and overlayed on plot
- TORQUE CURVE
    - Relies on significant data processing: quaternion calculation, gravity correction, global frame transformation, 2D projections.
    - Uses swing model to determine applied force and torque (Nesbit model).
- SHAFT DEFLECTION
    - Uses golfer applied torque and force to drive dynamic shaft deflection model.
    - Model was developed in-house and still requires validation.

FIG. 5

GROVE NUMBER CALCULATION

- Background
    - Use swing model to determine golfer applied torque.
    - Determine ideal torque profile through regression techniques.
    - This method provides a torque profile tailored to fit the biomechanics of each individual golfer.
    - Ideal torque represents a smoother profile with lower frequency content.
        - Leads to more consistent and controlled swings.
- Groove Calculation
    - Compare the ideal torque to the sensor recorded golfer torque using a Normalized Root Mean Square Deviation (NRMSD).
    - This provides a measure of signal deviation and ultimately erratic-ness of the swing.
    - Using linear transformation to scale NRSMD value to a range from 0-10.

FIG. 6

SYSTEMS AND METHODS FOR MEASURING AND ANALYZING THE MOTION OF A SWING AND MATCHING THE MOTION OF A SWING TO OPTIMIZED SWING EQUIPMENT

CROSS-REFERENCES TO RELATED APPLICATIONS

This application is a Continuation of U.S. application Ser. No. 18/163,838, filed on Feb. 2, 2023, and claims the benefit of U.S. Provisional Patent Application No. 63/306,309, filed on Feb. 3, 2022, the disclosure of each of these applications is incorporated by reference.

FIELD OF THE INVENTION

The invention encompasses a system and method for analyzing the motion of an individual for training and/or matching sporting equipment, for example, a golf club, to the individual. The system and methods includes one or more inertial acceleration sensors, one or more gyrometric sensors, a data acquiring unit, a core micro-controller, and a Bluetooth radio. The motion detecting unit detects at least one motion of, for example, a swing by measuring collecting various data related to for example, acceleration, torque, and sonification. Particularly, the sensors and data acquiring unit calculates information related to motion and using the acquired data to match a user's swing motion to optimized equipment or an optimized training paradigm. Particularly, the data acquiring unit acquires detection data from the sensor(s) and forwards such data to a computing device or server having stored information that matches the motion to an optimized equipment or training protocol.

BACKGROUND OF THE INVENTION

Methods for analyzing the motion of an object generally use one of two approaches: either motion sensors are attached to an object and sensor data is collected and analyzed or stationary devices such as video cameras or radars are configured to observe moving objects. For example, motion sensors may include inertial sensors that capture acceleration and gyroscope data, which is then integrated to measure an object's trajectory. Video analysis of motion may include traditional motion capture systems that use special reflective markers, or more sophisticated methods that use image processing to locate and track objects without markers.

Motion analysis methods based on a single type of sensor (such as a motion sensor, a video camera, or a radar) have limitations. For example, current inertial sensor based methods typically are not very accurate over long timeframes. Video based methods on the other hand may lose objects due to occlusion.

Known motion capture systems generally utilize several passive or active markers or several sensors. The data is generally analyzed in a laboratory on a per user or per swing basis and is not used for any other purpose besides motion analysis or representation of motion of that particular user and is generally not subjected to data mining.

There are no known systems that allow for motion capture elements such as wireless sensors to seamlessly integrate or otherwise couple with optimized equipment, such as a baseball bat, tennis racquet, golf club, or hockey stick in such a small format that the user is not aware that the sensors are located in or on these items. There are no known systems that provide seamless mounts, configured to capture motion data, and then forward such motion data wirelessly to a server database including data that matches such motion data to a specific piece of equipment or training protocol that is optimized to the performance of an individual, for example, an athlete.

Data derived from existing sensors is not saved in a database for a large number of events and is not used relative to anything but the performance at which the motion capture data was acquired.

There are no known systems that enable data mining for a large number of individuals related to their motion or motion of associated equipment to find patterns in the data that allows for business strategies to be determined based on heretofore undiscovered patterns related to motion. Existing systems further lack the capability to provide real-time feedback and comparisons with a stored data set to optimize equipment selection.

For at least the limitations described above, there is a need for a sensor-enabled motion analysis system and method that matches dynamic motion information detected using a sensor system of the invention to a database including information of specific "idealized" motion information, for example, information stored regarding sports equipment to match a user's swing to an optimal piece of sporting equipment.

SUMMARY OF THE INVENTION

In various embodiments, the invention encompasses systems and methods that match data collected from a sensor device including one or more sensors to stored data to match swing profile to preferred or optimized swing equipment (e.g., a golf club or bat).

In one embodiment, the invention encompasses a system or method to measure and analyze a swing and obtain data on the swing comprising a sensor device including:
 a) a core micro-controller and a radio;
 b) one or more low-inertial acceleration and/or gyrometric sensors;
 c) one or more magnetometer sensors; and
 d) a battery.

In certain embodiments, the sensor collects data including data on acceleration, swing motion, torque, velocity, and impact. In certain embodiments, the data collected using the sensors is sent to a computing device or server (e.g., remotely) and such data is matched to stored data comprising information corresponding to an optimized swing device. For example, using the data obtained from the sensors when a user swings an object including a sensor device that is attached to the object, the computing device or server then matches the user's swing motion to stored information corresponding to swing equipment that is best suited or "ideal" for optimal performance of the user. This information is optionally graphed to illustrate an idealized motion curve compared to an individual's actual motion (see, e.g., FIG. 7).

In another embodiment, the invention encompasses a system or method to measure and analyze a swing comprising a sensor device including:
 a) a core micro-controller and a Bluetooth low energy (BLE) radio;
 b) a first triad low-inertial acceleration and rate gyrometric sensor;
 c) a second triad high-inertial acceleration and rate gyrometric sensor;

d) triad magnetometer sensor; and
e) a battery and battery monitor.

In another embodiment, the invention encompasses a system or method to measure and analyze a swing comprising a sensor device including:
a) core micro-controller and a Bluetooth low energy (BLE) radio;
b) a first triad low-inertial acceleration and rate gyrometric sensor;
c) a second triad high-inertial acceleration and rate gyrometric sensor;
d) triad magnetometer sensor;
e) persistent storage; for example, to log and save, for example, 200 swings;
f) Qi wireless charging controller; and
g) a battery monitor.

In certain embodiments, the systems and methods include an interface with an antenna design (e.g., from TaoGlas), which may also perform performance tuning and pre-compliance validation.

In certain embodiments, the systems include a printed circuit board assembly.

In other embodiments, the systems include one or more inertial measurement units (IMUs) and a low-power device running on battery.

]. In certain embodiments, the systems include a user interface through BLE (Bluetooth low energy) to:
a. receive data from a live session;
b. capture inertial data (when BLE connected):
  a. Using high-G sensors to measure the ball impact;
  b. Using low-G sensors to record the swing motion;
c. on-board processing is required to:
  a. detect when club strikes the ball (end of swing);
  b. store live session data in volatile memory (e.g., RAM);
  c. communicate over BLE to:
    i. report the live inertial data for the last detected swing,
    ii. publish battery level; and
optionally including:
d. Qi charging functionality;
e. persistent storage to session logs;
f. production Modes (Standby-Mode, Sleep-Mode, On-Mode); and
g. BLE custom services to access log.

In various embodiments, the invention encompasses a system and method for golf swing analysis, including a golf swing analysis method and a golf swing analysis program that enables the swing action of a golf club to be modeled using a measurement device including sensors of the invention and matching the swing action to an idealized or optimal motion.

In another embodiment, the invention encompasses a golf club fitting apparatus, and program that are able to specify an optimal swing profile and accordingly an optimal club, shoe, or ball for a golfer.

In various embodiments, the system and method of the invention can be used to analyze a motion of an individual and generate a profile matching an individual's "actual" motion to an "idealized" profile of the individual's motion and accordingly to use the profile to match the motion with desired equipment for a specific activity. For example, the system and method can be used to generate a motion profile based on the motion of an individual swinging an object, including, but not limited to, a golf club, bat, hockey stick, lacrosse stick, field hockey stick, fishing pole, and the motion profile can also be used to match and individual to optimal sporting shoes, golf balls, and related equipment depending on the sport or activity where analysis is desired.

In certain embodiments, the invention encompasses a system and method for a swing analysis (e.g., a golf swing) for analyzing a swing action of, for example, a golf club and includes an acquisition device configured to acquire one or more measurement values obtained by measuring the swing action using an acquisition device, based on, for example, torque, sonification, and other measurement data that are obtained during the motion (e.g., swing action) based on the behavior of the motion (e.g., swing).

In various embodiments, the swing action is analyzed, based on a data collected from a device including various sensors including one or more gyrometers or accelerometers as described herein. Accordingly, the swing action of a golf club can be modeled using values measured by a measurement device attached to an object that is in motion.

In certain embodiments, the device is configured to measure or calculate an angular velocity based on the swing motion. In certain embodiments, the device is configured to measure or calculate torque based on the swing motion. In certain embodiments, the device is configured to measure or calculate sonification based on the swing motion.

In embodiments of the invention, a subject's movements while performing a swing are measured or detected by the system or device of the invention, the measurements are used to provide values for a plurality of parameters, and the parameters are analyzed and compared to "ideal" target values for these parameters. There are various methods known in the art that can be used to measure body and club movements associated with a golf swing.

By using motion analysis, exact measurements are provided from which values for a plurality of parameters are calculated and from which an evaluator can more accurately determine problems in a subject's swing.

Motion tracking or motion capture in some embodiments is achieved using a device of the invention, for example, where a subject attaches a device to an object to be swung (e.g., a golf club) to identify the motion by the positions or angles during a swing. One or more acoustic, inertial, magnetic, accelerometer, gyrometer or other sensors, or combinations thereof are included in the device, are used to sense data and analyze the data, optimally at least two times during the frequency rate of the desired motion. The device typically produces data with at least three degrees of freedom.

In various embodiments, the inertial motion capture technology is based on micro or nanosized inertial sensors, biomechanical models and sensor fusion algorithms. The motion data of the inertial sensors (inertial guidance system) is transmitted wirelessly to a computer, where the motion is recorded or viewed. In certain embodiments, the inertial systems use gyroscopes to measure rotational rates. In certain embodiments, the more gyroscopes the more natural the data. No external cameras, emitters or markers are needed for relative motions. Inertial systems capture a full six degrees of freedom body motion of a human in real-time and optionally can provide directional information if they include a magnetic sensor. Benefits of using inertial systems include no solving, portability, and large capture areas.

In certain embodiments, magnetic systems can calculate position and orientation of a swing. The relative intensity of the voltage or current allows these systems to calculate both range and orientation by mapping the tracking volume. The sensor output is six degrees of freedom. The sensor response is nonlinear, especially toward edges of the capture area.

In addition to body movement measurements, forces may be measured as well. One way to do so involves use of an appropriately programmed computer to model forces within the body, by ascribing masses and moments of inertia to the body segments and club and using body and club motions measured by the device to drive the model. The computer analyzes the motion and determines the relevant forces (e.g., torque) and motion (e.g., sonification).

The principle components of one embodiment of a device of the invention comprises acceleration, sonification, gyrometric, and inertial sensors, that collect data by attaching the device to a golf club, which communicates by wireless means with a transceiver that is part of a computer-based motion analysis system that includes a control and display capability, such as a laptop computer, with suitable application software and an onboard or connected database. Other sensory devices and other sensors are connected to system by wire or wireless (e.g., Bluetooth). The system processes motion data and generates, displays and/or transmits reports, graphs, and/or feedback and also may provide prescriptions as described in more detail below. Training tools may or may not be directly linked to the motion analysis system or the other associated components, but may be used by the evaluator or subject during practice exercises as prescribed by the system after testing and analysis.

As described in the context of motion capture systems of the invention, devices used in measuring the movements that can be used to calculate values for the various parameters include sensors placed on desired parts of the object. These sensors optionally include, but are not limited to, one or more reflective or illuminated markers, gyroscopes to measure angular velocity; accelerometers to measure inclination or linear acceleration; magnetometers to measure magnetic field strength or direction; electrodes to measure changes in electrical potential (e.g., eeg monitor), muscle activation, or heart rate; pressure, force, or torque sensors to measure kinetic interaction; cameras coupled with or without markers to measure position of body segments or objects; force platform systems to measure ground reaction forces and moments; goniometers to measure joint angles; speed sensors to measure speed; and temperature sensors to measure body parts or ambient heat. These sensors optionally are connected to one processor or to a network of processors that acquires the movement data during the testing session by sampling and storing the signal from the sensors at predefined sampling frequency.

Data acquired by the sensors and stored in a memory during the individual's movement is processed to obtain values for specific descriptive parameters, such as, for example, torque, rotation velocity, free moment, position of the object, velocity of the individual's swing. Measurement in most embodiments uses a "comparison model" to compare the values of the parameters obtained from a subject to "ideal" target values for these parameters to provide guidance on how the subject can alter his or her technique to increase performance and/or reduce the risk for injury or alternatively to match an individual's swing to equipment that is optimal for the individual. Thus, the comparison model comprises comparing the subject's actual movement (described by a set of discrete parameters) with target (ideal reference) parameters.

Analysis of the data acquired typically involves custom algorithms. These algorithms include, but are not limited to, altering the measurement units; calibrating the signals to account for the location of the sensors on the club, on the golf club, golf ball, or in the environment; smoothing or filtering the signals; analyzing and combining the signals to obtain the specific descriptive parameters; extracting discrete metrics from the descriptive parameters; comparing the individual's movement (described by a set of discrete parameters) with target parameters using a comparison model to evaluate the performance or the risk of injury and, optionally, to provide data on how the subject can improve his or her technique, or identify optimal equipment.

In certain embodiments, the algorithms includes using a swing model to determine golfer applied torque, determining an ideal torque profile through regression techniques, providing a torque profile tailored to fit the biomechanics of each individual golfer. In certain embodiments, an ideal torque represents a smoother profile with lower frequency content and leads to more consistent and controlled swings. In certain embodiments, the algorithms compare the ideal torque to the sensor recorded golfer torque using a Normalized Root Mean Square Deviation (NRMSD). This provides a measure of signal deviation and ultimately erratic-ness of the swing, and using linear transformation to scale NRMSD value to a range from 0-10 to provide a swing profile value or number.

A first step in the analysis is to conduct calibration routines for each sensor to obtain signals in the proper units. The units of the signals from the sensors are converted from the measured units (e.g., volt) to the desired measurement units (e.g., degree per second, or g-force) using predefined calibration equations. The signals can be the modified based on the placement of the sensor and conditions of the testing session. Calibration procedures are customized to the specific types of sensor being used as well as the location of the sensor on the objects being swung. For example, calibration routines for an accelerometer attached to a golf shaft segment identify the position and orientation of the sensors relative to the segment. Additionally, in some cases, the sensors are adjusted based on the initial conditions of the testing session (initial position, orientation, etc.). The data may be filtered or smoothed using either standard signal processing filters (e.g., Butterworth filters, Gaussian filters, etc.) or custom designed filters specific to the application.

Once the data is in the proper units and adjusted, a customized analysis of the movement is completed, which depends on the type of sensors used and the movement analyzed. In general, the signals are processed to obtain values for the key parameters, critical temporal features of the movement are then identified (for example, the beginning of backswing, initial downswing, mid-downswing, late downswing, ball impact, end of follow-through, etc.), and discrete metrics are determined either as values of the descriptive parameters at those critical time points or statistical reduction of the parameters between time points. If a desired parameter is not measured directly, the data from the sensors is manipulated to produce the desired parameter; for example, position may be the desired descriptive parameter but velocity is actually measured, therefore velocity is integrated to calculate position. The sensor data may also be combined to reduce the error of measurement using methods such as Kalman filtering; for example, position data calculated from velocity may be enhanced using occasional position data to correct for drift in the non-ideal velocity sensor.

Once data is acquired and analyzed through movement measurement and value calculation for the parameters, feedback is provided to an evaluator and/or directly to the subject. Feedback may be provided in any number of ways, for example, various graphical displays may be used to provide feedback. For example, feedback may be provided by displaying the outputs of the comparison model in chart or graph form, as shown in FIG. 7 on a monitor or other display. The charts or graphs may display not only the most recent variables, but a series of variables taken over time, as well as target parameters, and the like. Alternatively or in addition, the graphical display may include images of the subject (or an avatar) performing the movement, with superimposed visual indicators showing optimal movement accomplishment. In some embodiments, the display may use perspective techniques to display a three-dimensional animation such that body movements can be seen from different points of view in a three-dimensional space. Furthermore, the graphical display may include videos of other subjects performing ideal or non-ideal golf swings with explanations and/or comparisons to the current subject's movement. In addition, information such as text or a cartoon might be provided. The graphical display may be on a computer monitor, a TV, a smartphone, provided by a projector, or other type of display platform. Similar visual methods to the methods presented in this paragraph are used to communicate the results of the performance evaluation to the individual.

In addition to using graphical displays, feedback may also be provided to the subject by way of audio signals, such as bells, beeps, buzzers, chimes, alarms, a synthetic voice giving instructions, or other suitable sounds. In some embodiments, the sounds audible to the subject can be descriptive: one sound (e.g., a clicking sound, a buzz, a beep of one tonality) can indicate that a movement has been performed inappropriately; another sound (e.g., a swoosh sound, a pleasant chord, or a beep of a different tonality) can indicate that the movement has been performed appropriately. In some embodiments, the pitch, intensity, and/or frequency of the sound can change to provide information about how much the individual's movement and/or position varies from a certain value or range of values or to provide other information to the subject. Audio feedback may be provided from feedback devices located on the individual's body or separated from the body.

The invention also includes techniques for sonification of a golf swing data. In one technique, recorded golf swing data was used to generate synthetic sounds. Club head velocity and X-factor each controlled the frequency of one vocal formant, and X-factor also controlled left-to-right stereo panning. Human sounds are known to be readily recognizable and reproducible and therefore serve as useful feedback and an effective way to sonify or map sound from data. In certain embodiments, identification of golf swing rotational biomechanics were more discernable to participants who were given audio-based feedback compared those using visual observation of video, demonstrating that sound sonification may offer a valuable training modality for real-time identification of golf swing biomechanics essential to power generation.

In certain embodiments, the device includes a sonification sensor or ultrasonic trigger or uses the sensors to calculate this information. The ultrasonic trigger may have one or more ultrasonic emitters that are capable of emitting sound waves towards an object or objects in a target area. The sound waves are emitted periodically, and travel towards the target area. Once the sound waves reach an object within the target area, they strike the object and are reflected. Once the sound waves are received, they may be analyzed to determine kinematic characteristics of the golf club and golf ball, such as velocity, spatial position, and the like. These characteristics may be used to compute activation times for image acquisition equipment.

In certain embodiments, a sonification sensor is capable of functioning without the assistance of any secondary reflectors. In other words, the invention does not require any additional apparatus to focus the sound waves toward a receiver. The invention is capable of more reliably determining position and velocity of a golf club or golf ball based solely on the waves without the need for additional equipment.

The frequency of the emitted sound waves may be selected so that the likelihood of interference from extraneous sources, such as ambient sound and the like, is eliminated or substantially reduced. Preferably, the emitted sound waves have a frequency that is not susceptible to outside interference. Having waves that are not susceptible to outside interference aids in allowing the device to function without secondary reflectors.

In a preferred embodiment, the device comprises an ultrasonic sensor that may be used in conjunction with a device that measures the kinematics of a golf club and golf ball. An embodiment of the invention provides an ultrasonic transducer that periodically emits sound waves and receives echoes. The sound waves and the received echoes may be used to determine the position and velocity of a golf club and/or golf ball. The use of sound waves prevents substantially all outside interference from interfering with the measurements.

The present invention functions as a system that can be adapted to work with any type of device that measures the kinematics of an object.

In one embodiment, the device may be used with any type of golf equipment. It may be placed in any orientation, which may be determined according to a particular application.

In an embodiment, any type or combination of sensors may be used. Alternately, one or more sensors may be combined or operatively connected. Any type of sensor known to those skilled in the art may be used. In a preferred embodiment, the sensor is capable of detecting sound waves in the ultrasonic frequency range, which is between about 10 and about 500 KHz. In one preferred embodiment, the frequency is about 100 KHz. Those skilled in the art will recognize that the pulse duration and pulse frequency of the sensors may be altered according to a particular application.

In some embodiments, the number of combined sensors may be based on the type of motion or type of swing that is being observed. In embodiments, it may be desirable to have a larger number of sensors in order to obtain more data. In embodiments, fewer sensors may be necessary to obtain desired data.

In an exemplary embodiment, the method according to the invention comprises sound waves being emitted by the motion of the device attached to a golf club. The sound waves are preferably focused towards a predetermined target area. The size of the area may be determined by the types of objects being used in a particular application. In a preferred embodiment, the area should be large enough for a player to swing a golf club.

In another embodiment, the invention encompasses a golf swing analysis system in which the device is attached to a club and is configured to acquire the measurement value of the swing action measured by an acceleration sensor and an angular velocity sensor attached to the golf club that serve as the measurement device. Here, the swing analysis is based on the acceleration sensor and the angular velocity sensor attached to the golf club. A golf swing analysis system may also be configured to further acquire the measurement value of the swing action measured by a geomagnetic sensor attached to the golf club that serves as the measurement device. Here, the device includes a geomagnetic sensor in addition to the acceleration sensor and the angular velocity sensor, and the device is attached to the golf club.

In another embodiment, the invention includes a golf swing analysis system comprising a device further including the various sensors configured to calculate at least one of a head speed, a torque exertion amount, an average torque, an average power and an energy exertion amount, as a swing profile characterizing the swing action based on the data collected by the sensors in the device.

Here, at least one of head speed, torque exertion amount, average torque, average power and energy exertion amount is calculated as a swing profile characterizing the swing action. Accordingly, the swing action can be evaluated based on at least one of head speed, torque exertion amount, average torque, average power, and energy exertion amount.

In certain embodiments, a golf swing analysis method for analyzing a swing action of a golf club includes the steps of measuring the swing action using a device including the sensors described herein deriving a parameter of the golf club that occurs during the swing action, based on a measurement value of the swing action, and deriving a swing profile.

In another embodiment, the invention encompasses a golf swing analysis system stored in a non-transitory computer readable medium of the invention is for analyzing a swing action of a golf club and causes a computer to execute the steps of acquiring a measurement value obtained by measuring the swing action using a measurement device, deriving a behavior of a golf club that occurs during the swing action, based on the measurement value, and deriving a swing profile.

The inventors found that a relationship exists between predetermined swing indices such as head speed and torque exertion amount and the swingability of the golf club such as the weight of the club and the moment of inertia about the end. For example, as the club becomes heavier, the golfer becomes unable to freely swing the golf club and head speed decreases. In contrast, head speed plateaus after the weight of the club drops to a certain level. This is because the club cannot be swung at greater than the power used for a full swing. On the other hand, the torque exertion amount during the swing increases as the golf club becomes heavier, but when the weight of the club increases to a certain level, the golfer reaches his or her limits and the torque exertion amount plateaus. That is, the swing indices stop increasing if the golfer has reached his or her limits, even if the club is made easier to swing or harder to swing.

Another embodiment of the invention includes a golf club fitting apparatus includes an acquisition unit, an index calculation unit, and an optimal index specification unit. The acquisition unit is configured to acquire a measurement value obtained by measuring a swing action taken with each of a plurality of golf clubs. The index calculation unit is configured to calculate a swing index, which is an index characterizing the swing action, for each of the golf clubs, based on the measurement value. The optimal index specification unit is configured to specify an intersection point between a first regression line and a second regression line, based on the swing indices calculated by the index calculation unit, and specify one of an optimal index, which is the swingability index at or near the intersection point, and an optimal index range. The first regression line is a regression line of the swing index in a constant region where the swing index is roughly constant relative to the swingability index. The second regression line is a regression line of the swing index in a proportional region where the swing index is roughly proportional to the swingability index.

Accordingly, here, an optimal swingability index that realizes an optimal swing index corresponding to the golfer's limits is specified. That is, the optimal swingability for the golfer can be specified.

Another embodiment of the invention includes a golf club fitting apparatus of the invention is the fitting apparatus of the golf club in which the acquisition unit is configured to acquire a first measurement value obtained by measuring the swing action of a golf club having an extremely small swingability index, and a second measurement value obtained by measuring the swing action of a golf club having an extremely large swingability index. Also, the optimal index specification unit is configured to specify the first regression line, based on the swing index that is based on the first measurement value, and the second regression line, based on the swing index that is based on the second measurement value, or specify the first regression line, based on the swing index that is based on the second measurement value, and the second regression line, based on the swing index that is based on the first measurement value.

Another embodiment of the invention includes a golf club fitting apparatus in which at least one of a head speed, a torque exertion amount, an average torque, an average power and an energy exertion amount is included in the swing index. Here, the swing index is evaluated based on at least one of head speed, torque exertion amount, average torque, average power, and energy exertion amount.

Another embodiment of the invention includes a golf club fitting method including the following steps:
(1) measuring a swing action taken with each of one or more or a plurality of golf clubs using a measurement device of the invention including the sensors of the invention;
(2) calculating a swing index, which is an index characterizing the swing action, for each of the golf clubs, based on a measurement value of the swing action;
(3) specifying a first regression line of the swing index in a constant region in which the swing index is roughly constant relative to a swingability index representing an ease of swinging the golf club, based on the calculated swing index;
(4) specifying a second regression line of the swing index in a proportional region in which the swing index is roughly proportional to the swingability index, based on the calculated swing index; and
(5) specifying an intersection point between the first regression line and the second regression line, and specifying one of an optimal index, which is the swingability index at or near the intersection point, and an optimal index range.

BRIEF DESCRIPTION OF THE DRAWINGS

FIG. 2 illustrates additional features that can be included in the system and method to process data.

FIG. 3 illustrates an overview of how data is processed using the system and method of the invention.

FIG. 5 illustrates an overview of how data is plotted to generate a swing profile curve using the system and method of the invention.

FIG. 6 illustrates an overview of determining how a golfer's swing can be used to generate a swing profile based on collecting data using the sensors to obtain swing torque data.

DETAILED DESCRIPTION OF EXEMPLARY EMBODIMENTS

Figure 1:
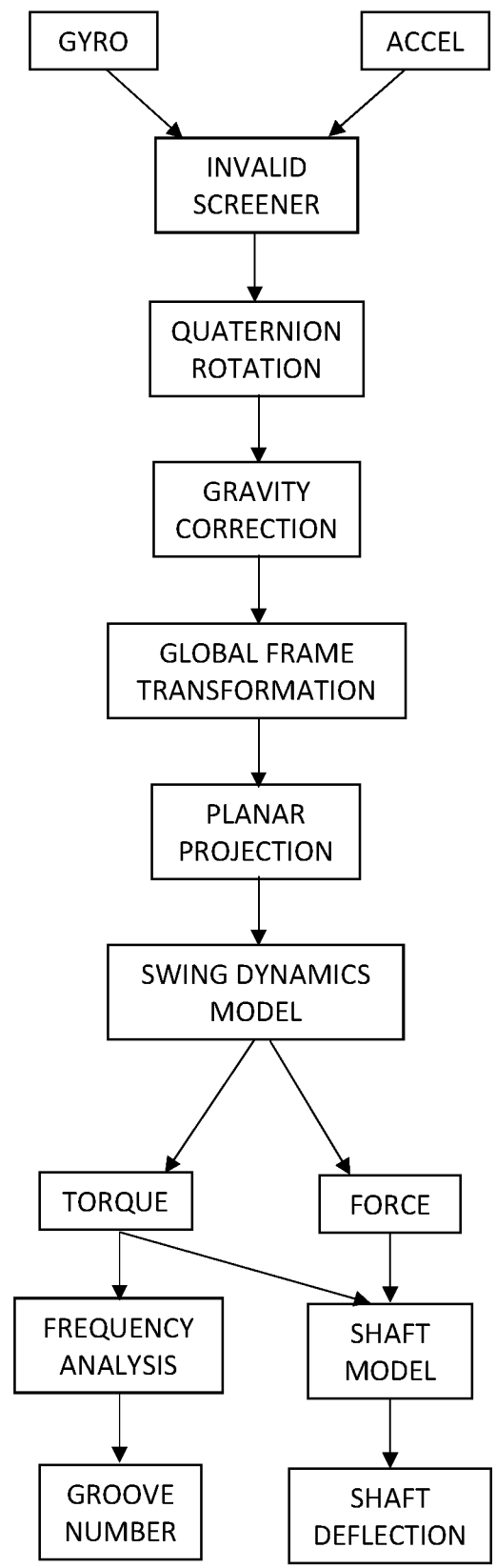
FIG. 1 illustrates a schematic overview of how data is processed using the system and methods of the invention.
Figure 4:
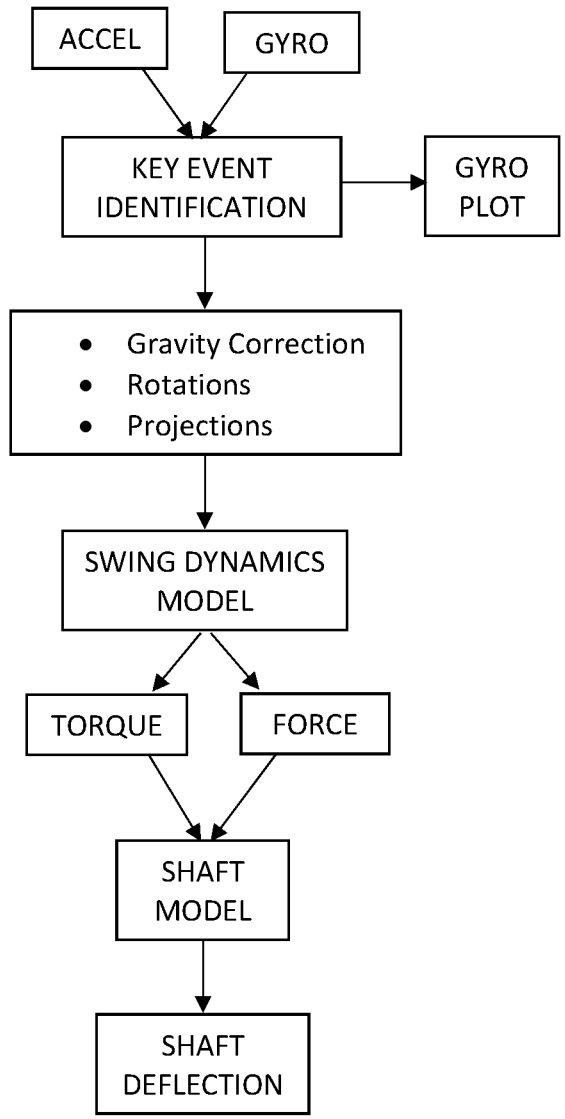
FIG. 4 illustrates a schematic overview of how data is plotted using the system and methods of the invention.
Figure 7:
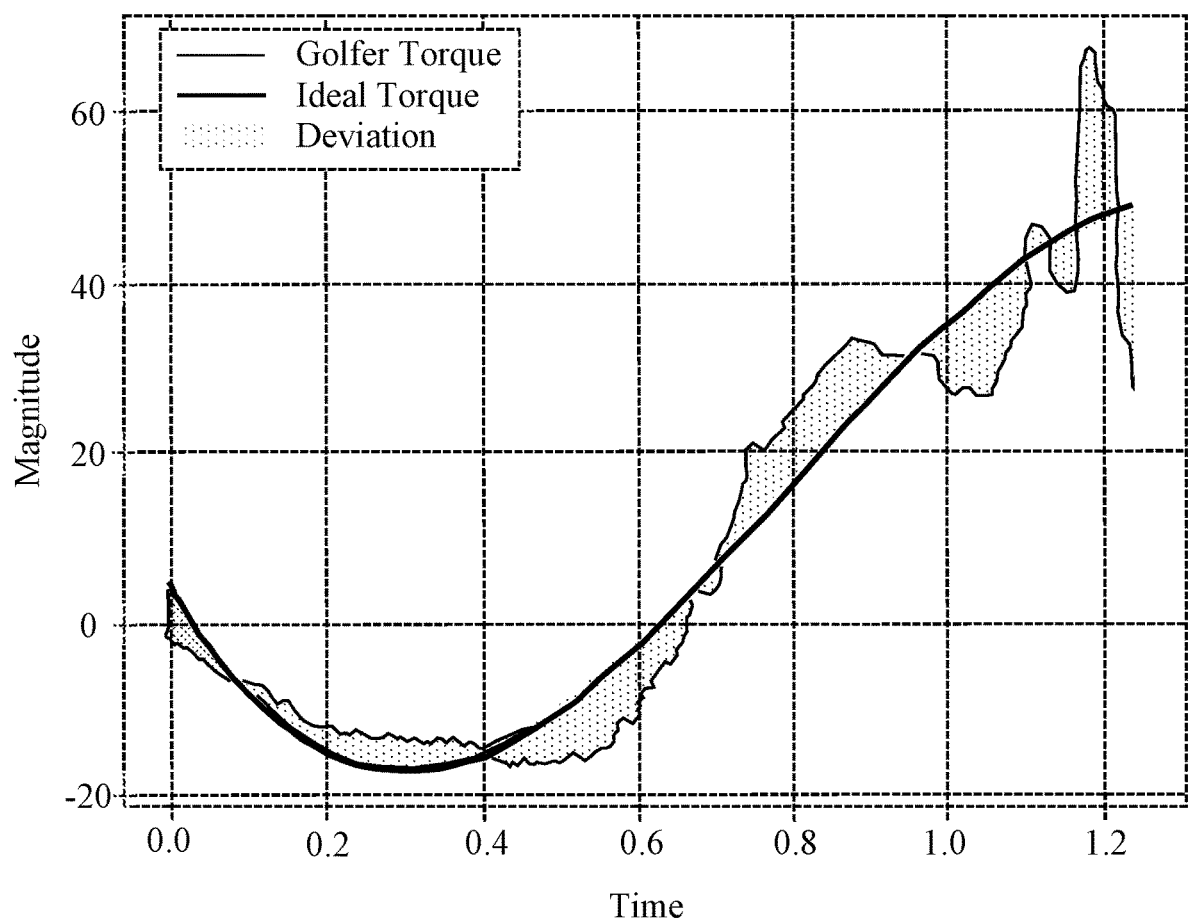
FIG. 7 illustrates an exemplary swing analysis of the magnitude of a golf swing plotted against time. The graph illustrates an ideal swing torque compared to a golfer's swing torque illustrating the deviation between the two, which can be used to match a club or training paradigm to a golfer's swing.

The invention encompasses systems and methods for acquiring data in real-time, analyzing the data, and providing real-time feedback to the user. The various embodiments allow a user using the system to track, quantify, and evaluate swing motion of equipment. For example, while swinging a bat or golf club, the systems and methods of the invention process sensor data quantifying relevant characteristics of a swing motion of a user, as well as to evaluate the data by comparing it simultaneously to stored data sets pertaining to an optimized swing device and then matching one or more optimized swing devices to the user. The data collection and comparison can be done remotely, for example while a user is in his or her home or at any venue by sending data from a sensor device attached by a user to standard personal equipment at a remote location and then sending the data to a computing device or server including the data pertaining to the optimized swing device.

As used herein, the terms "comprise", "comprises", "comprising", "having", "including", "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

In certain embodiments, a user may receive feedback in real-time via a cell phone or personal computing device (e.g., a tablet or computer) using an application (App) or signing into or registering with a website. In certain embodiments, the feedback occurs throughout the entirety of a swing and provides data at various points (e.g., mid-swing or after completion of a swing) to illustrate that the movement or action conforms to the template (e.g., "idealized") set of data and allows a user to select an optimized equipment specific to said user's swing motion data. For a single motion or for discrete motions performed throughout a session, the systems of the invention may provide a quantified measurement of the motion, such as a normalized "score" or percentage deviation between the test and template data sets.

Further, the system and methods can be also be used to provide swing information over time to monitor the progress of a swing. For example, systems may automatically adapt templates based on progress from prior measurements and long-term goals, making sure captured data from a user's swing motion or motions matches desired criteria, such as orientation, speed, and/or range of motion, for example. Over time, the systems may allow for cloud-based review of progress by the user or a third party (e.g., a sports trainer or equipment professional), highlighting results, which may include modifications or instructive motions, different motion instructions altogether, or a varied combination of regimens.

The embodiments offer improved functionality of accounting for and correlating different variables associated with a swing motion. The various embodiments of the invention offer an improved solution by correlating different tracked data over time and recognizing relevant trends or patterns in the data that may not be apparent without multidimensional correlation.

The various embodiments offer an improved solution by providing an automated, immediate, and accurate indication to a user that acquired data matches desired characteristics, as well as receiving feedback and providing it to the user in real-time. For example, the embodiments provide real-time feedback to users based on pattern matching algorithms. When received sensor data matches a predefined rule, the sensor or an associated device may provide an indication to the user (e.g., visually, audibly, and/or tangibly) that a swing motion matches preferred optimized swing equipment. In other examples, real-time data is provided to a third party (e.g., a coach, trainer, professional), offering the third party the option to input feedback that systems then transmit to a user in real-time. The relevant real-time feedback, automatic and/or manual, may allow the user to adapt, allowing for users to more effectively receive information feedback.

In another embodiment, the invention offers the improvement of highlighting relevant trends over time between different data profiles. Further, the embodiments may track relevant progress, such as a range of motion or deviation from a template profile. For example, systems and methods may determine that a deviation in a user's swing motion has digressed at a particular magnitude or duration.

The embodiments may include generating, utilizing, and/or manipulating a data profile.

In some embodiments, a data profile may be a multidimensional data stream over time or a portfolio of multiple time-synchronized streams of data. A data profile may correlate two or more time-dependent sets of data, such as data received from various sensors. For example, a data profile may represent acceleration in three axes over time. In another example, a data profile may include an accumulated magnitude of movement (e.g., an activity measurement metric) and a recorded activity measurement metric over time. In still further examples, data from, for example, various sensors including, but not limited to, one or more: inertial sensors, magnetometer sensors, gyro sensors, pressure sensors, force sensors, and electrical sensors may be correlated with information, such as swing speed or motion. Other types of data streams may be generated using the sensors and types of data discussed in this specification, consistent with disclosed embodiments. In other embodiments, correlations of performance to other external factors are possible.

The embodiments may include generating, utilizing, and/or manipulating a motion swing profile. In certain embodiments, a swing motion profile may be a data profile that describes the motion of one or more swings over time. A swing motion profile may include a timewise multidimensional record of motion. For example, swing motion profiles may include three-dimensional acceleration data, three-axis orientation data, three-axis angular velocity data, and/or three-axis gravitational information over time. In some embodiments, the acceleration and/or orientation data may include data for less than three dimensions, such as single or dual axis acceleration and/or orientation data. The swing motion profile may combine unique signals of the same motion, such as correlating linear acceleration and angular acceleration.

In various embodiments, based on the motion profile, the embodiments include rendering a graphical representation of a corresponding motion in space. In the example of a three-dimensional motion profile, disclosed embodiments may include rendering a line in a three-axis space illustrating the path of the object. In still further embodiments, the rendered display may include an animation showing an icon oriented (e.g., based on orientation data) and moving along the path at a rate commensurate with the acceleration data of the motion profile. Such data may also be rendered alongside or overlaid on top of synchronized captured video data.

The embodiments include comparing one or more swing motion profiles or, more generally, swing data profiles to stored data and using a computer algorithm to match swing data to an optimized swing equipment that is optimized based on a user's swing data. In some embodiments, systems and methods may determine the magnitude of the differences between two profiles. Such differences may indicate how closely two sets of data match, such as two swings of a golf club. The differences may be quantified using different calculations. In one example, disclosed embodiments may sum the aggregate difference of a fixed period of time (e.g., integrate the differences). Some embodiments may normalize the integrated amount on a per unit time basis.

Additionally, or alternatively, the claimed embodiments may include comparing two profiles by determining that at a predefined set of points in time (e.g., one or more timewise data points) the two profiles differed by more than a threshold amount (e.g., a predefined threshold or an automatically adjusted threshold).

The embodiments may include utilizing event models to recognize data profiles or portions thereof that match particular criteria. These criteria may include simple thresholds or complex curve-matching algorithms. In the example of complex curve fitting, an event model may be defined by a specified contour for particular variables of a profile, such that they-axis displacement (e.g., ordinary least squares difference) or orthogonal distance (e.g., total least squares difference) is below a threshold amount. The amount may be normalized based on the type of application or magnitude of the test profile data.

The embodiments may use one or more of these concepts individually or in combination as discussed herein.

In certain embodiments, the invention encompasses an exemplary real-time data acquisition, quantification, analysis, and feedback system according to certain embodiments of the present disclosure. The system may include one or more sensor devices, computing device, a network, and server.

The systems and methods of the invention may include one or more sensor devices to aggregate sensor data. Sensor devices represent the one or more sensors that provide data to system. Each of the sensor devices may include the same sensor capabilities or different capabilities. For example, one sensor device may include an inertial measurement unit, while second sensor device provides gyrometric data. In a differing example, the entire sensor shown could only include inertial measurement units, but could be located in a single device, or on different points of a single device. Sensors may provide various sensed data to system as further discussed below.

The system and method may include a computing device. In some embodiments, a computing device may be a general-purpose computer, tablet device, smartphone, or smart watch. The computing device may include a processor, memory (e.g., RAM, flash memory, and/or a hard disc), various wired and wireless interfaces (e.g., Bluetooth, IEEE 802.11, Ethernet, USB, USB-C, and/or proprietary ports), input devices (e.g., touchscreen, keyboard, mouse), and a display. The computing device may operate programmable instructions stored locally or remotely to perform disclosed processes.

The computing device interacts with one or more sensor devices. The computing device may receive sensor data from sensor device(s). For example, one or more sensors may send, in real-time, data received from sensors. Sensor data may be high-resolution data, and the connection between sensor device and computing device may be a high bandwidth connection, such as a Bluetooth wireless connection. While such high bandwidth wireless technologies may use more power than alternatives (e.g., Bluetooth "low energy"), the increased data resolution that may be used by system may require higher bandwidth wireless interfaces.

In various embodiments, the systems and methods may include controlled device(s) that perform functions based on received instructions. For example, controlled devices may include output devices, such as remote displays, speakers, and tactile engines that provide feedback to a user of sensor device. These types of controlled devices may provide a status indicator to the user based on the sensor data, such as informing the user that the sensor device is providing a data profile that meets expectations by displaying a green light, playing a positive tone, or tapping the user via a worn tactile engine.

In some embodiments, a network may be a wired and/or wireless network. For example, a network maybe a LAN, WAN, WLAN, or the Internet. The system may use a network to connect various devices. For example, a computing device may connect to server, controlled device(s), and/or sensor device using the network. Alternatively, a computing device may interface directly with sensor device and/or controlled device(s). For example, a computing device may form its own wireless access point to connect to other devices.

In various embodiments, the system includes a server to provide networked storage and analysis. A server may be a networked computer. The server includes a central processing unit, such as at least one data processor that executes program components for executing user- or system-generated requests. The processor may include specialized processing units or a general-purpose microprocessor.

The server facilitates network-based (e.g., "cloud") storage and data interaction. For example, a computing device transmits data profiles and the underlying raw data to server for storage. In an embodiment, the server may analyze data profiles in real time or over time and provide feedback based on sensor data. The server transmits notifications (e.g., uploads data, updates databases) based on analysis of data.

In some embodiments, a server serves as a portal to allow users to interact with archived data profiles and raw data. For example, a server can provide a graphical user interface that presents data profiles organized by particular categories of swing equipment.

The sensor device may include a processor, storage, input-output, IMU (inertial measurement unit), gyro sensor(s), wireless transceiver, and/or a power source.

In some embodiments, the processor is a general-purpose processor, programmable microcontroller, programmable processor (e.g., a field-programmable gate array (FPGA) or complex programmable logic device (CPLD)), or an application specific integrated circuit (ASIC).

In some embodiments, storage may include internal storage and/or external storage. Internal storage may include, for example, on-board memory, such as flash memory or RAM. External storage may include, for example, removable memory media, such as compact flash cards, secure digital cards, memory sticks, optical disks, and the like. In some embodiments, storage may include non-transitory computer-readable media that stores instructions that, when executed by a process (e.g., processor), cause the processor to perform disclosed functions and processes.

In certain embodiments, the input-output may include output and input. In some embodiments, output may include lights (e.g., on or more LEDs, an LCD display, a laser, a projector), speaker(s) (e.g., a piezoelectric speaker, a buzzer, a siren, a loudspeaker), and tactile engine (e.g., vibrators, haptic feedback mechanisms). Lights may include lights on various surfaces and different angles of sensor device.

Input may allow a user to activate and interact with sensor device. In some embodiments, input may include a physical input mechanism (e.g., button, switch, capacitive interface) or a way to receive input (e.g., an infrared receiver, an optical receiver, a USB or serial port). Physical input mechanisms, for example, may allow the user to turn sensor device on and off, synchronize with a computing device, and/or change modes.

In some embodiments, the system and method includes one or more sensors that may include one or more IMUs to capture multi-dimensioned acceleration and orientation data. In certain embodiments, the sensors may include magnetometer, gyroscope, and/or accelerometer. In certain embodiments, processor may sample acceleration and orientation data at a rate of about 50-500 samples per second. In some embodiments multiple IMU devices may be "stacked" and then time sliced to permit N Factor sample rate increases such that two such devices can generate samples per second or even more.

In some embodiments, one or more sensor devices may include multiple instances of measurement as a redundant measure to filter outlying measurements. For example, processor may receive three-axis acceleration data from two or more sensors in the device. The processor may average the acceleration data to increase accuracy, or when there are two or more sensors, a processor may not make use of the highest and lowest readings, averaging the remaining readings to reduce measurement inaccuracies.

The sensor device may include various sensor(s). In some embodiments, sensors may be embedded in sensor device as internal sensor(s). In some embodiments, sensors may interface with computing device through a port or physical interface as external sensor(s).

In some embodiments, the sensor device may include wireless transceiver. The transceiver may facilitate communication with computing device, network, and/or controlled device(s). In some embodiments, transceiver may include Bluetooth transceiver and/or Wi-Fi transceiver. In an example, a Bluetooth transceiver may be a Bluetooth "classic" transceiver, rather than a Bluetooth "low energy" transceiver in order to provide increased bandwidth to transmit high resolution sensor data (e.g., to computing device) in real-time. In another example, Wi-Fi transceiver may be an IEEE 802.11a/b/g/n/x transceiver. Additional wired and/or wireless standards may be used consistent with the bandwidth requirements of the disclosed systems and processes.

The sensor device may include power to provide electricity to components, such as processor and storage, among other elements. In some embodiments, power may include a direct current power source, such as a battery. For example, power may include a lithium ion polymer (LiPo) battery, nickel-metal hydride (NiMH) battery, and/or a nickel-cadmium battery. When power includes a battery, power may further include recharging circuitry, such as an electrical port, a removable battery, and/or inductive charging circuitry.

In certain embodiments, a sensor device may removably attach temporarily during data acquisition to golf club. In some embodiments, a mount may be used to secure sensor device to golf club. The golf club can be drivers, fairway woods, hybrid clubs, irons, and pitching wedges or putters, any of which may all serve as golf club. The sensor device may connect to golf club, for example, at the base of grip. This positioning of sensor device may advantageously provide more accurate inertial data of the swing motion. A "swing" may refer to the motion of teeing off with a driver, swinging an iron on a fairway, and/or putting with a putter, for example. Additionally, placement at the base of grip may allow users to swing golf club without sensor device interfering with their line of sight. However, in other embodiments, a sensor device may be mounted at other position on a golf club. In still other embodiments, multiple sensor devices may be mounted at different positions of golf club, such as near head, along the shaft, and/or at various locations on grip.

In certain embodiments, the sensors may also include a feedback mechanism (e.g., light or speaker) that notifies a user when the system is active and ready to transmit data. This notification may occur at the exact prior to swinging and/or during a golf swing. Alternatively, the feedback mechanism may be programmed to notify a user after completion of a golf swing, either automatically, or in response to a user request for feedback and/or sensor data.

In certain embodiments, to provide the data to system, the sensors may form an independent sensor device (e.g., a version of sensor device). For example, the sensors may independently transmit data over a wireless connection (e.g., a Bluetooth connection) to computing device. Similarly, an independent sensor device may participate in a sensor mesh network to send data through the system. Alternatively, the sensor(s) may interface with the sensor device (e.g., as one or more external sensor(s)) to provide the data to system. For example, the sensor may transmit data to processor for handling via an external sensor interface in sensor device.

Alternately, in other embodiments, the device includes a sensor that preferably emits ultrasonic waves over an area of sonification. Preferably, the area of sonification is a substantially circular area having a diameter between about 6 inches and about 2 feet. More preferably, the area of sonification is a substantially circular area having a diameter between about 1 foot and about 2 feet.

Once the sound waves are emitted to one or more desired points, at least a portion of the emitted waves will be reflected by the objects in the target area. Other portions of the emitted sound waves may not hit an object, and may continue into space until they dissipate. In a preferred embodiment, the reflected sound waves are received by a plurality of sensors. The sensor may be connected to any type of computing device. The computing device may comprise one or more microprocessor, electronic gate, or the like. In a preferred embodiment, the output of the sensors is analyzed to determine various characteristics of the movement of the golf club and/or golf ball. The position and velocity of the objects are among the characteristics that may be computed. In other embodiments, other desired characteristics may be computed.

In one embodiment, the invention determines the position and velocity of the objects and then sends this information to a computing device, such as a processor or the like.

In another embodiment, the systems and methods of the invention may be used with a tennis racket, hockey stick, baseball bat, fishing rod, etc. including a sensor device.

Similar to the system described above, in a system for a tennis racket, hockey stick, baseball bat, fishing rod, etc., a sensor device (e.g., including one or more sensors) may attach to the tennis racket, hockey stick, baseball bat, fishing rod. In some embodiments, a mount may be used to secure sensor device to the tennis racket, hockey stick, baseball bat, fishing rod, etc. This positioning of the sensor device may advantageously "hide" the sensor device from the line of sight of the user while he or she operates a tennis racket, hockey stick, baseball bat, fishing rod, etc. In still other embodiments, the sensor device may be mounted at a different position, such as at the top, along the shaft, and/or on grip.

Additionally, one or more additional sensor units may be used. For example, additional sensors may measure the pressure of the user's hand. Such sensor data may be used to generate a pressure map. Based on the sensor data, the system may provide feedback on the orientation of the equipment during a stroke. For example, in the context of golf, a club may be less efficient when its face is not held perpendicular to the direction of the swing. The calculated pressure map may reveal points at which the club is not being effectively swung, and a system may provide user feedback to adjust the orientation to provide maximum swing.

A sensor device may be attached to other equipment, such as apparel (e.g., belts, bracelets, shirts, shoes), walking assistance devices (e.g., canes, walkers, scooters, crutches, and/or fitness equipment (e.g., medicine balls, jump ropes, helmets, elastic bands).

In some embodiments, various sensors may interface with a single sensor device. The sensor may connect to sensor device (e.g., as external sensor(s)). More than one sensor may determine two or three dimensions. Based on the multi-dimensional data, the system may generate a map, and provide feedback to the user in real-time to improve swing. For example, various parts of output may be used to indicate to the user that the user should increase swing speed.

In various embodiments, a sensor device may perform certain data aggregation, calculation, and/or feedback functions locally.

In some embodiments, a sensor device may initiate a connection to computing device based on input from a user (e.g., using input, such as a button). For example, a sensor device may utilize a Bluetooth pairing procedure or connect to computing device via a Wi-Fi connection. In some embodiments, computing device may search or look for sensor devices that are trying to connect or available for connection. In some embodiments, this may include a calibration procedure.

A sensor device may calibrate sensors, such as inertial or gyrometric sensors, prior to pairing with computing device. For example, a sensor device may provide an indication to a user (e.g., a flashing light of lights) to indicate to a user to rotate sensor device so that IMU may align its axes and adjust scaling factors to increase accuracy in position and orientation calculations. In other embodiments, calibration may occur during or after pairing, such as when the system determines that the data from the sensors lacks necessary precision.

In certain embodiments, the invention encompasses a system and method for analyzing a swing profile. The term "swing profile" as used in this disclosure may refer to various golf motions, including swinging a driver, performing a chip shot, and/or putting with a putter, for example. The terms "putt profile" and "swing profile" may be used interchangeably. A computing device may retrieve a data profile (e.g., a motion profile) to serve as a template or pattern for comparing purposes. The data profile may include multi-dimensional acceleration and/or orientation data corresponding to a golf swing. In an embodiment, the template swing profile may be recalled from local or network storage. For example, a computing device may request a particular template swing profile from server or other cloud storage.

In an embodiment, loading a template swing profile may include recording one or more motion profiles for an actual swing. For example, a user may provide an initial motion at the start of a practice session that acts as a template and may want to practice repeating that initial, template motion. To record an initial template motion, a system may receive sensor data from a sensor device that is recorded during the swing motion. For example, one or more inertial or gyrometric sensors, for example, may record acceleration and/or orientation data along three or fewer axes during a particular swing motion. A sensor device may transmit the sensor data to the computing device, which may, in turn, store the IMU data for the swing motion as a motion profile. For example, the "ideal" template swing may be recorded in a preferred setting, such as with a trainer, and later recalled when a user practices without the trainer nearby.

In another embodiment, the system and method may include recording a motion, generating the template, storing the template in a networked server (e.g., server), and/or requesting the stored template for networked storage and matching said swing profile to an optimized equipment. In still further embodiments, the system and method may include receiving a motion profile that is generated from a software application, rather than recorded from a live motion. For example, a computing device may receive a motion profile generated by process and then match the motion profile with an optimized type of equipment, driver, wood, iron, or putter. Additional combinations or intermittent processes may be used such that computing device receives a data profile or a motion profile for use consistent with the remaining steps of process.

In certain embodiments, the system and method may receive real-time sensor data. A computing device may receive real-time data from sensor device. In some embodiments, a computing device may receive sensor data in real-time over a wireless transmission technology such as Bluetooth or Wi-Fi (e.g., using Bluetooth transceiver and/or Wi-Fi transceiver). A computing device may receive packets of data containing real-time data samples from one or more of internal sensor(s) and/or external sensor(s). For example, a computing device may receive one or more packets containing 1-10 samples of data for a given sensor over an interval of 1-5 milliseconds, with less than a 5-millisecond delay from capture by sensor device. The samples may be stored as time value pairs in an array, such as sensor sample values paired with timestamp values in a list. In some embodiments, a computing device may continue to receive sensor data packets so long as sensor device captures relevant data. Following data capture, the computing device may then match a swing profile based on the sensor data with various stored club information profiles such that a user is matched to an optimized golf club based on the user's swing profile.

In certain embodiments, the systems and methods of the invention may calculate a test swing profile. A computing device may aggregate received sensor data into a combined time-wise arrangement of sensor readings. In some embodiments, a computing device may create a new data structure organizing the sensor data for a given motion. The data structure may store an abbreviated form of raw sensor data with standardized metadata in a data object. For example, a computing device may receive raw sensor data having varying fidelity (e.g., differing sample rates and/or data precision). The computing device may organize data such that the resulting class of data structures has consistent sampling rates and/or sample data with consistent resolution (e.g., values having the same number of significant figures). For example, a computing device may down-sample sensor data having a sampling rate greater than the standardized sampling rate or range of sampling rates for a given class or type of swing profile (e.g., a type of motion profile) data structures. For received sensor data having a sampling rate that is lower than a minimum sampling rate for a given class of swing profiles, a computing device may interpolate additional data points to achieve the desired sampling rate (e.g., using curve fitting or regression analysis).

In some embodiments, the swing profile (e.g., a data profile or motion profile) may include standardized metadata. For example, the swing profile class may include fields for standardized data analysis variables, such as mean and median values of the sensor data, as well as standard deviation, high value, low value, local minima and maxima, and points of inflection. Additional data analytics discussed throughout this disclosure may be stored as part of the swing profile.

In some embodiments, the calculations may include comparing the test swing profile to a reference profile, such as the template swing profile. A computing device may compare the two profiles to determine where the two profiles deviate and how much the two profiles deviate. In an embodiment, a computing device may generate a profile indicating the differences over time. Additional comparisons may be made consistent with the data profile and motion profile comparisons discussed in this disclosure.

In certain embodiments, the systems and method of the invention may provide feedback based on the calculations made by the computing system. Feedback may include visual, tactile, and/or auditory signals directed to a user and/or third party. The feedback may be based on the calculated test swing profile, its associated metadata, or a comparison based on the same. The calculations may act as triggers for feedback. For example, when a test swing profile deviates more than a predefined amount, a system may generate feedback and match the swing with a specific optimized golf club. In another example, a system may generate feedback when the test motion profile matches certain criteria, such as an average or standard deviation value. Such values may be user defined or pre-defined (e.g., from loading a template profile). Feedback may be provided to a user between 5 and 20 milliseconds from receiving the data from the sensors, for example.

In some embodiments, a computing device may provide feedback to a user. For example, computing device may generate a graphical user interface that displays an analysis of sensor data. The graphical user interface may depict different views of the swing motion, such as those depicted in user interface and then recommend an optimized piece of equipment.

In certain embodiments, the systems and methods of the invention provide real time data acquisition and feedback graphical user interfaces according to certain embodiments of the present disclosure, which may include regions to depict real-time, relevant feedback as well as representations or abstractions of sensor data previously received from sensor device. In some embodiments, an interface may include one or more dimensional views that include a functional spatial map of the processed sensor data, such as top view region, side view region, and back view region. Each of the plurality of views may display an elevation (e.g., side, top, back) of a golf motion (e.g., a golf putt, a golf swing) plotted on respective axes. In some embodiments, the depicted paths may be annotated or colored to convey additional data about the putt profile data. For example, the line path may be color coded to note the motion acceleration (e.g., green for accelerating and red for decelerating) or deviation for a template putt profile (e.g., red increasing in shade to correspond to the amount of deviation). Other color coding may be used to convey different putt or swing variables.

In certain embodiments, this includes a metadata display region. This region may display the timestamp of the putt profile and various labels, such as an identification number and/or title for the motion profile. While not shown, region 705A may also include location data, such as GPS coordinates, a geographic region, and/or a hole number and corresponding golf course.

In addition to real-time data, the interface may also include a record of prior data and may include a list of prior profiles, with selection region indicating the selected putt profile for full display.

The user interface may include a computing device (e.g., computing device). With smaller space, the user interface may show metadata display region and top view region at once. However, the user may interact with the user interface to retrieve additional data (e.g., the regions of interface) via menus. For example, a user may scroll through different elevation views of the putt profile and select the depicted "BACK" arrow to return to a list of past recorded putt profiles.

The computing device may transmit one or more signals to a sensor device to trigger output based on calculations. For example, a computing device may transmit (e.g., using wireless transceiver) an instruction to activate light(s), speaker(s), and/or tactile engine. In one example, when a computing device determines that the test swing profile matched the template swing profile, it may transmit a signal to display green lights. However, when the test swing profile deviates more than a specified amount, the instruction may activate red lights of sensor device. In another example, a computing device may transmit an instruction to sensor device to have tactile engine perform a particular vibration and/or have speaker(s) play the sound of a crowd cheering when test swing profile meets certain criteria. Other triggers and combinations for feedback mechanisms may be used based on environmental conditions.

In other embodiments, a sensor device may locally perform calculations and initiate feedback without instructions from computing device. For example, a processor may perform the above-discussed functions of computing device and locally initiate one of the feedback mechanisms.

In some embodiments, a sensor device may identify particular sensors to sample data from. For example, a processor may identify a sensor for data capture.

In certain embodiments, the systems and methods of the invention may acquire data from one or more sensors. In some embodiments, a sensor device may commence recording and processing of sensor data from one or more sensors (e.g., inertial or gyrometric sensor(s)). For example, a sensor device may record sensor readings in temporary storage over a predefined interval.

In some embodiments, a sensor device may evaluate whether the data meets certain qualifications for processing. Certain types of data may represent noise or other non-useful data. For example, a sensor device may evaluate whether motion data corresponds to a golf swing, rather than errant non-swing movement of the club (e.g., walking with the club, placing the club in a golf bag, setting up to swing). The sensor device may filter out movements that are determined to not correspond to a golf swing. In some embodiments the filter may calculate the amount of deviation and filter out data that is too noisy to represent a simple swing motion. For example, a swing normally may include two continuous movements (e.g., the back swing and forward swing) that occur over a relatively standard range of time. In other embodiments a simple filter where readings below a specified magnitude are filtered out. For example, a sensor device may identify minor movements that have acceleration values below a threshold amount and discard them. In still other embodiments, a sensor device may power down or enter a "hibernation" mode to conserve power when no satisfactory data is received.

In certain embodiments, the systems and methods may determine whether a backup copy of the acquired data needs to be saved. In some embodiments, a sensor device may determine whether sufficient storage exists and/or whether preferences dictate that the sensor data should be archived locally.

In certain embodiments, the systems and methods may transmit the acquired sensor data to local storage. For example, when a sensor device determines that preferences dictate that data be stored locally and detects an external storage device a sensor device may save sensor data to local storage (e.g., internal storage and/or external storage).

The sensor device may transmit acquired sensor data. In some embodiments, a sensor device may transmit sensor data to computing device or server. For example, when accumulated sensor data reaches a predetermined threshold, such as a percentage of the amount of local storage used, or a predetermined time duration, a sensor device may format and send acquired sensor data to computing device for further processing.

In certain embodiments, the systems and methods provide real-time data acquisition and feedback according to some embodiments of the present disclosure. In certain embodiments, the systems and methods are discussed regarding computing device to analyze sensor data and recommend an optimized swing device. However, additional devices may perform disclosed functions, in whole or part. For example, a sensor device may perform certain feedback calculations locally, rather than receiving an instruction from computing device to do so.

In certain embodiments, the systems and methods include a computing device that may recall user data from networked or local storage. For example, a computing device may transmit a request including a user identifier for past data associated with the user. Based on the request, a computing device may receive past user data (e.g., data profiles), user preferences, such as motion profiles for particular movements.

In certain embodiments, the systems and methods include a computing device that receives real-time data from one or more sensors and matches such data based on a user's swing to an optimized piece of equipment, for example, a golf club, that is optimized based on an analysis of the data from the sensors matching a user's swing profile to an optimized club. In some embodiments, a computing device may receive sensor data in real-time over a wireless transmission technology such as Bluetooth or Wi-Fi (e.g., using Bluetooth transceiver and/or Wi-Fi transceiver). A computing device may receive packets of data containing real-time data samples from one or more of sensor(s). For example, a computing device may receive one or more packets containing 1-10 samples of data for a given sensor over an interval of about 1 to about 5 milliseconds, with less than about 5 to about 20 millisecond delay from capture by the sensor device. The samples may be stored as time-value pairs in an array, such as sensor sample values paired with timestamp values in a list. In some embodiments, a computing device may continue to receive sensor data packets so long as sensor device captures relevant data.

In some embodiments, a computing device may receive multiple motion data streams simultaneously. The simultaneous streams may come from sensors that are located on a swing device. In the example of sensors, a system may receive the sensor data and interlace it to increase resolution of the data. For example, the sensor data streams may have the same sample interval, but the system may control the sampling time to offset each stream based on the number of streams to increase resolution. The computing device may divide the sampling rate by the number of streams to calculate an offset amount. The computing device may provide instructions to each sensor device to begin sampling at a multiple of the offset amount such that no two sensor devices sample at the exact same time. The computing device may combine the sample streams by interlacing the discrete data points based on their associated timestamp.

In the example of multiple motion streams from different locations, the sensor may be located at different portions of a user's club, for example to account for changes in orientation of the swing. Such an exemplary sensor arrangement may be used to measure the range of motion. Such an arrangement may advantageously provide more accurate range of motion data because the sensor device takes into account the relative orientation in three-axes, rather than being limited to an angle in a single dimension.

In other embodiments, the systems and methods may obtain various measurements with the use of only a single sensor device. For example, a single sensor device may provide three-axis orientation data over time. The user may detachably affix sensor device to a golf club, for example, and the sensor device may transmit orientation data indicating the orientation over time. In this example, the sensors may be used to calculate the range of motion by determining the magnitude of the origination data of a particular axis or combination of axes over time. Based on orientation data from multiple axes, a computing device may calculate an equation defining a three-dimensional plane (e.g., $ax+by+cz=0$) in which the motion takes place. Then, within that plane, a computing device may determine the number of degrees through which the orientation passes. Thus, even though a user's motion may not perfectly occur such that it only occurs along a single axis, such as when a user performs a swing while slightly bent over, computing device may calculate the range of motion on a coordinate system normalized for the orientation of the body while a user performs a given motion.

A computing device may create data profiles based on the real-time data received from various sensors. For example, the computing device may organize real-time data into standardized sampling rates and number of significant figures of measurement values. When necessary, a computing device may convert units of measurements to be consistent for all data profiles of the same type (e.g., to use metric units).

In creating data profiles, a computing device may manipulate the raw data received from sensor devices. For example, a computing device may discard data values above and/or below predefined maximum and/or minimum values. The computing device may also fit a curve or polynomial function to the data. When multiple sensor data streams are received, a computing device may triangulate the data from multiple streams to increase the accuracy and reduce the noise in the resulting data profile.

In some embodiments, a computing device may correlate real-time data from a plurality of sensor devices simultaneously.

The systems and methods of the invention may determine whether to transmit automatic feedback. The computing device may compare the calculated data profile with various criteria. For example, the computing device may determine whether characteristics of the data profile, such as the average value, standard deviation, slope, and points of inflexion match criteria, such as criteria loaded from an optimized club profile. In certain embodiments, the systems and methods may include comparing the data profile to a template to determine how much the data deviates from a desired template data profile. For example, a computing device may compare the calculated data profile to a template data profile based on the amount of deviation, such as the average deviation amount, summed total deviation, or maximum deviation. Based on this comparison, a computing device may determine that automatic feedback should be provided matching a swing profile to an optimized swing device.

In certain embodiments, the systems and methods of the invention may provide iterative feedback. The computing device may compare swing data profile to multiple template profiles to determine which template profile most closely matches the swing profile. The comparison may be based on a least squares difference between the test and template curves. In other examples, a Fourier transform may be compared. Further, a comparison may be performed by determining a deviation amount between test data (e.g., a test motion profile) and template data (e.g., a template or optimized motion profile for a club) over time to determine the deviation amount for the test motion profile indicating how the test motion deviated from the target motion profile, or indicating that the that the target motion occurred. Additional comparisons of data profiles may be used as described throughout this disclosure. Each template profile may be associated with a different type of feedback (if any), and based on which template is best matched (e.g., has the lowest deviation amount, highest correlation, lowest least-squares difference), the computing device may provide feedback, including, in one example, which type of optimized golf club to recommend with one or both of the control and controlled device being selected based on the template data profile that most closely matches the test data profile. Such feedback may include an indication of the profile that the test data profile most closely matched and a quantitative "score" of the motion based on the deviation amount.

The systems and methods of the invention may transmit a feedback generation signal. Based on received real-time data meeting certain qualifications, the computing device may transmit a signal to generate feedback, such as feedback at sensor device using one or more of output. For example, responsive to determining that the average value of a particular sensor falls within a certain range.

In some embodiments, each criteria or qualification may be paired with a particular type of feedback. Such pairings may be stored in the user profile. For example, when sensor data falls within a certain range, a predetermined type of feedback may be provided. In an embodiment where different templates are mapped to different types of feedback, computing device may transmit the corresponding feedback instruction to a sensor device. In certain embodiments, when the user's swing movement results in a motion profile that matches the template motion profile the computing device will recommend one or more optimized golf club(s).

For example, when a computing device is a tablet computer, the computing device may display data profiles on a touchscreen of the user interface. In some embodiments, the user interface may display analytics together with a selection area to provide feedback to user. For example, a coach, trainer, or equipment expert may hold a tablet that displays real-time analysis of a user swinging. The user interface on the tablet may show accelerometer data in one or more dimensions, along with the individual metric scores. In an embodiment, the metric scores may be displayed in bold, italics, underlined, or in certain colors when the metric falls within a predetermined range and recommends an optimized golf club.

The systems and methods of the invention may determine whether manual feedback has been received. In an embodiment, the user interface of the computing device may provide an area to select user feedback. For example, a third party may manually select the type of feedback and when to send it. The third party may be monitoring real-time data profiles and associated metrics and decide when to initiate feedback.

In an embodiment, the system may monitor the manual feedback, including the type and timing of the manual feedback to suggest an automated rule to provide feedback. For example, the system may capture the data profile and associated metrics that occur at each manual feedback request and accumulate the information to provide a recommendation on optimized swing equipment. The system may recognize trends in the timing and type of feedback. For example, the system may determine that the third party switched from using lights for feedback to tactile feedback halfway through the motion or exercise. In another example, the system may recognize that feedback was initiated when a particular metric dropped below a threshold or matched a particular pattern. In still other examples, the system may recognize variable thresholds imposed by manual feedback.

In certain embodiments, the computing device may provide a graphical user interface that allows a third party to observe relevant data and highlight data of interest. For example, when metrics exceed individualized thresholds, a graphical indication (e.g., color highlighting or bold font) may be used to highlight the particular metric and corresponding user in real-time. The graphical user interface of the computing device may reorder the listing of user's data to show the highlighted data at the top of a list of user data. In still further examples, a computing device may calculate data for subsets of users. For example, a computing device may receive input defining a series of personal identifiers as belonging to a group. A computing device may then calculate and display relevant data for the group.

The user interface may then receive input from the third party (e.g., using a touchscreen) to select a user or group of users to provide feedback. The computing device may receive a selection of one or more user identifiers, a group identifier, or all users as well as a type of feedback to transmit to each sensor device for the selected users. For example, the computing device may receive an instruction to transmit an instruction to sensor devices to generate a particular pattern. Still further embodiments may allow the third party to select a subset of users to provide additional data, such as a live plot of a particular selected metric over time (e.g., multiple golf swings).

In another example, a golfer's club may be equipped with sensor device. Each sensor device may transmit accelerometer data and gyrometric sensor data to a computing device, which may be operated by a third party, such as an assistant coach, trainer, or professional. The computing device may calculate relevant acceleration metrics for display on a graphical user interface. At the conclusion of each play, the computing device may highlight individuals who may warrant a detailed swing analysis. For example, the computing device may include acceleration and gyrometric thresholds that are used to identify various events. A computing device may further generate a timewise correlation of the acceleration data, impact events, and gyrometric activity to identify a particular user identifier to the third party using the graphical user interface. For example, a swing with that lacks acceleration magnitude may be used to highlight individuals that may have suffered, for example, trauma. The computing device may generate or transmit an instruction to the sensor device of the identified user to generate a sound or activate onboard lights so that the individual may be easily identified by training staff or other professionals.

The systems and methods of the invention may transmit a feedback generation signal. For example, the computing device may transmit an instruction to the corresponding sensor device to initiate the feedback. The systems and methods of the invention may determine whether monitoring should continue. In an embodiment, the systems and methods of the invention may continue while sensors continue to provide real-time data. When a motion is complete and sensor device deactivates, the process may end.

In various embodiments, the systems and methods of the invention may associate particular equipment with sensor data. For example, the systems and methods of the invention may be used to evaluate different golf clubs and other sports equipment. Associated sensor data from a user performing a given activity may be used to quantitatively rate the equipment. For example, a user may swing a club multiple times, and each time the user swings, the systems and methods of the invention may receive sensor data, such as acceleration data, gyrometric data, and other data to calculate metrics for each different swing. By comparing the data profiles obtained while swinging with stored profiles, the computing device may determine a quantitative score to evaluate a swing and recommend and optimized swing device (e.g., golf club). For example, the score may represent a normalized aggregation of the difference in the test swing profiles for each swing compared with a template motion profile of a most efficient swinging technique, the speed of the swing (e.g., adjusted based on the number of swings previously done), and personal data (e.g., from sensor data). Additional variables may be used to evaluate the equipment consistent with this disclosure.

The systems and methods of the invention optionally include a server that may receive a user profile, including for example, a swing profile for a user.

The systems and methods of the invention receive aggregated sensor data. The server may receive data profiles obtained while the user performs the activities. For example, computing device may upload calculated data profiles at regular intervals (e.g., minute, hourly, daily) or when a session is complete (e.g., after not receiving additional data for a predetermined period of time, when determining that all prescribed swings and/or motions in a plan have been completed for a given day). The server may automatically add the received data to the record of the user, for example, in an electronic record by interfacing with existing records in the database software and match the data with optimized equipment. For example, the server may determine if the uploaded data profiles indicate whether the user is suited to use a specific type of equipment, for example a particular shaft on a golf club. For example, the server may determine that a user's swing matches a desired threshold for a stored piece of equipment. In another example, the server may determine that the sensor data indicates that a sensor device has a range of motion that is increased beyond a target range, such as a user being suitable for multiple different types of optimized stored equipment (i.e., the users swing profile matches multiple clubs or shafts stored in the server). In still further examples, the server may determine that sensor data matches a pattern, and the pattern may be determined to indicate sufficient confidence or lack thereof in matching a swing profile with an optimized club or shaft.

The systems and methods of the invention may include additional calibration steps after secondary calibration, providing additional levels of refinement. In some embodiments, the systems and methods of the invention may include tertiary and/or quaternary calibration. As an initial matter, the system may perform these additional third and fourth calibration steps based on available processing power, complexity, and application demands. For example, the system may determine that high precision is enabled, such as based on a particular activity or measurement type. Based on this determination, the system may perform third, fourth, and subsequent "n-levels" of calibration based on the demands of the activity and/or measurement. For example, a server may receive an activity and or measurement type identifier and look-up or otherwise derive the number of iterations of calibration required.

In some embodiments, tertiary, quaternary, and/or "n-level" calibration may be performed using the same processes described for secondary calibration. However, these additional calibration steps may be performed with higher precision. For example, in a case where secondary calibration determines a sensor device position and orientation to the nearest 0.1 units (e.g., cm, inches, degrees, radians), tertiary calibration may verify the 0.1 unit measurement and calculate the position and orientation with a precision of 0.01 units. Following this example, quaternary calibration, if the system determined that it needed to be performed, may calculate the position and orientation with a precision of 0.001 units. The confidence thresholds and/or pattern matching discussed for primary and secondary calibration may also apply to tertiary, quaternary, and/or "n-level" calibration.

In an embodiment, a server may receive an update to the plan from the third party via the user interface. For example, the third party may approve or modify suggested automatic changes to the plan. In an alternative example, the third party may negate proposed changes and/or include a message (e.g., text, video, audio) for the user.

The systems and methods of the invention may transmit the automatic update without manual review and/or manual updates. The server may send a modified plan to computing device. The modified plan may include instructions, such as a recommendation for a different optimized swing equipment, an explanation of any alterations, and/or a message from the third party. For example, a professional may indicate that the user is performing a certain motion activity incorrectly, along with an instructional video overlaying a rendering of the user motion captured in the data profiles with the template motion.

In some embodiments, template motion profiles may be generated by recording a person performing the "ideal" template motion while wearing a sensor at a certain golf club location. However, in other embodiments, it may be desirable to electronically generate a motion profile for a specific motion, such as when a person is not available to perform the "ideal" motion. The systems and methods of the invention allow a user (e.g., the sensor wearer) and/or a third party (e.g., professional) to electronically create a motion profile without the need to record a person performing the template motion ideally or in-person.

The systems and methods of the invention calculate the movement of the sensor device based on the swing motion of the user. In an embodiment, a computing device may determine the path taken by sensor device. Based on the movement, a computing device may extrapolate the orientation and acceleration of the sensor device in three dimensions over time, resulting in a motion profile for the motion described by the user in the user interface and may be shown on computing device (e.g., a computer, tablet, smartphone).

Some embodiments may use orientation and displacement characterizations of the swing profile to calculate angular velocity ranges across three dimensions. Some embodiments may consider angular velocity as a pseudovector, such as one having magnitude (e.g., angular speed) and direction (e.g., the axis of rotation, such as one based on the right-hand rule). For example, disclosed embodiments may determine the velocity of the sensor device based on the recorded displacement data. And, the system may combine the three-axis velocity information with the orientation data to derive the angular velocity (e.g., as a vector, as component parts of a vector). For example, a system may determine the angular velocity based on the cross-product operation of the velocity and displacement information, such as:

Other embodiments may utilize other calculations to determine effective variables, including angular velocity. While the initial data received may not be normalized to a particular unit scale, certain embodiments may make use of the relative magnitude or variance of the data, including using ratios of vector components and magnitudes to determine a swing profile.

In some embodiments, the system may perform statistical calculations for the raw data profile and/or calculated data profiles. For example, a computing device may calculate the variance, average, average magnitude, and/or standard deviation of each dimension of time-wise data in the data profiles (e.g., raw data profiles, calculated data profiles). In another example, a computing device may calculate the covariance between two dimensions of time-wise data of a raw data profile, such as the x-axis and y-axis acceleration data.

The system may match the statistical calculations to expected statistical calculations for each potential body region. In some embodiments, a computing device may calculate the difference (e.g., least square difference, other statistical deviation measurements) between the raw data and template data for each swing motion. For example, a computing device may calculate the difference between the x-, y-, and z-axis average values, variances, and/or standard deviations to the respective template values of each swing motion. The system may identify the optimized equipment with the closest match (e.g., lowest least squares difference).

In various embodiments, the invention encompasses systems and methods that match data collected from a sensor device to stored data to match swing profile to a preferred or optimized swing equipment (e.g., a golf club or bat).

In certain embodiments, the systems and methods of the invention encompass measuring properties of a swing member according to various aspects of the present technology and may operate in conjunction with any suitable shaft and/or swing member. Various representative implementations of the present technology may be applied to any system for measuring the effects of applied loads and/or identifying physical characteristics of a swing member. The swing member may comprise any suitable device having a longitudinal axis such as: a shaft, beam, rod, tube, column, post, rebar, and the like. The test member may also comprise a device that is swung during use such as: a golf shaft, a baseball bat, a tennis racket, a hockey stick, and the like.

In various embodiments, the sensor device including one or more sensors sends data to a computing device, server or any data acquisition system that may collect sensor data for use in calculating one or more parameters of the test member such as stiffness, straightness, torsional rigidity, and dampening properties. The data acquisition system may comprise any suitable system or device for processing data according to desired criteria such as a workstation, personal computer terminal, test station, or the like. The data acquisition system may be integrated into the sensor device or comprise a separate system communicatively linked to the sensor device. The data acquisition system may be configured to receive, translate, convert, or otherwise process any type of data stream collected into a format that may be used to calculate the desired properties of the test member.

For example, in one embodiment, the data acquisition system may comprise an analysis engine configured to compare pre-loading and post-loading data from the sensor device to calculate a stiffness profile for the test member. The data acquisition system may also be configured to compare pre-loading data against a baseline reference to calculate a straightness value/score for the test member.

The data acquisition system may also be suitably configured to account for any distortions within the captured data. In one embodiment, a calibration process may account for tangential and radial distortion that comprises taking several swings to identify a calibration matrix.

The user interface may provide operator control or access to the test stand. The user interface may comprise any suitable device or system for allowing a user or operator to run a testing sequence, analyze results, access, print, copy, or forward test results, or otherwise use the test. In one embodiment, the user interface may comprise a display and an input device such as a keyboard or a mouse. In a second embodiment, the display and the input device may be combined into a single component such as a touch screen display, tablet, or table computer linked to the controller.

In certain embodiments, the systems and methods of the invention may be configured to measure the relative stiffness ("EI" or flexural rigidity) of a test member such as a rod, shaft, beam, or any other similar object. "E" represents Young's Modulus and "I" represents the second moment of inertia of a cross-section of the test member. It is known that both "E" and "I" may vary independently of each other along the length of certain types of test members such as a golf shaft. As a result, the sensor device may be configured to implement a technique of measuring the EI of a shaft, which calculates a continuous EI function over the length of the shaft by measuring how the shaft may bend under loading such as during one or more phases of a golf swing.

In certain embodiments, this technique attempts to determine a continuous EI function by treating the golf shaft as a cantilevered beam. Traditional bending equations for cantilevered beams, however, may not provide accurate test results because they are generally intended for beams that experience small deflections under loading and generally have a constant EI along the length of the beam being tested. Therefore, a more complex model is used by the technology of the invention based on the data collected by the sensors to calculate an EI, or stiffness profile, for the shaft as a whole.

In certain embodiments, this model calculates EI as a function of x along the length of the shaft in association with a corresponding deflection of the shaft along a perpendicular y-direction.

Therefore, for a given deflection profile for a shaft represented by the deflection in they-direction as a function of length in the x-direction, or along the shaft, the first and second derivatives may be determined and EI may be determined at any point along the shaft.

In certain embodiments, in order to account for noise, a high order polynomial is fit to the deflection profile according to the sensor of the shaft when deflected by the loading system. The equation can then be solved at any given point along the shaft and the EI profile for the shaft as a whole may be calculated.

The test method obtains continuous EI data for the length of a shaft and may more accurately replicate the way a shaft is loaded in a golf swing. This method also allows measurements along the total length of the shaft between the first and second end portions unlike other methods such as a 3-point bending method that uses segmented lengths of a member. This method also reduces inconsistencies associated with operator based testing such as those that may be introduced as a result of an operator reading a gauge using his/her eye or movement of the member by the operator during testing.

Using the sensor device of the invention, the deflection (or bend) profile of the shaft may be measured by a data acquisition system in reference to the deflection datum established by the straightness line from a straightness calibration obtained by the calibration rod or the straightness profile of the shaft. A polynomial equation may be fit to each of the top and bottom edge data to generate fitted top and bottom values for each x-location value. In certain embodiments, the fitted top and bottom edge values may be averaged and the corresponding y-location values from the straightness calibration may be subtracted to obtain an average deflection for each point along the shaft. This average deflection may be converted to meters of deflection using pre-determined calibration factors. Another polynomial equation may be fit to the average deflection data, resulting in the creation of several polynomial coefficients. The resulting coefficients may be saved, exported, or otherwise collected for reproducing the calculated deflection profile for the shaft.

Using information relating to the applied load, sensor data, deflection data, differentiation, and a set of calculations, the EI profile may be calculated by the analysis system for each point, pixel location, or other desired criteria along the length of the shaft. For example, the data acquisition system may then calculate the first and second derivatives of the polynomial equation fit to the average deflection data using any suitable method. The data acquisition system may then obtain the amount of force being applied to the shaft from the load cell and convert it to a moment as a function of the x-location value along the shaft in Newton Meters. For each point along the shaft, the EI may be calculated and then using such calculations optimized swing equipment may be matched to a user's swing profile.

The system and methods of motion analysis (e.g., golf swing analyzing apparatus) according to the exemplary embodiment of the present invention may provide a user with various golf swing analysis information by calculating a speed of a golf club and a speed of a golf ball.

In certain embodiments, to calculate a speed of a golf club and a speed of a golf ball, the golf swing analyzing apparatus radiates a transmission wave to the golf club and the golf ball by using one Doppler radar sensor, and detects a reflected wave, in which a reflected wave of the golf club and a reflected wave of the golf ball are mixed. The Doppler radar sensor detects a frequency deviation between the transmission wave and the mixed reflected wave and generates an output signal. The output signal generated by the Doppler radar sensor is a signal, in which a signal related to the speed of the golf club and a signal related to the speed of the golf ball are mixed.

The sensor system of the invention calculates a swing speed of the golf club, a speed of the golf ball, a carry distance, and accuracy of hitting by using the output signal generated by a Doppler radar sensor, which can be incorporated into the systems and devices of the invention.

In various embodiments, the data obtained by the sensors can be analyzed by fast Fourier transforming a signal output from a Doppler radar sensor according to an exemplary embodiment of the present invention.

In certain embodiments, he swing analyzing system and device according to an exemplary embodiment of the present invention a signal sensing unit, a signal preprocessing unit, a swing analysis information calculating unit, a display unit, an input unit, and a memory unit.

In certain embodiments, a sensor radiates a transmission wave to a golf club and/or a golf ball by using a radar. The sensor detects a reflected wave, in which a reflected wave of the golf club and a reflected wave of the golf ball, detects a frequency deviation between the transmission wave and the mixed reflected wave, and generates an output signal. For example, the signal detecting unit may include a Doppler radar sensor using the Doppler effect.

The output signal of the signal detecting unit is a signal related to a speed of the golf club and a speed of the golf ball. The signal pre-processing unit removes a noise of the output signal generated from the signal detecting unit, converts an analog signal that is the output signal, in which the noise is removed, into a digital signal, and provides the swing analysis information calculating unit with the converted digital signal.

For example, the signal pre-processing unit may provide the swing analysis information calculating unit with the output signal. A horizontal axis represents an index of a sample for the Fast Fourier Transform and a vertical axis represents a signal, in which signals related to a speed of a golf club and a speed of a golf ball are mixed, as a digital value.

The swing analysis information calculating unit calculates a speed of the golf club and a speed of the golf ball by using the output signal of the signal detecting unit.

In order to calculate a speed of the golf club and a speed of the golf ball, the swing analysis information calculating unit may include a ball speed calculating unit and a club speed calculating unit. The ball speed calculating unit calculates a speed of the golf ball based on a frequency component obtained by converting the output signal of the signal detecting unit into a frequency region. Since a speed of the golf ball is highest at the moment of hitting the golf ball by the user, the ball speed calculating unit may calculate a speed of the golf ball by using the highest frequency value in the output signal of the signal detecting unit.

One or more additional embodiments encompass a multi-sensor event analysis and tagging system. Embodiments of the invention enable intelligent synchronization and transfer of generally concise event videos synchronized with motion data from motion capture sensor(s) coupled with a user or piece of equipment. In certain embodiments, the sensor of the invention saves storage and increases upload speed by uploading event videos and avoiding upload of non-pertinent portions of large videos. In certain embodiments, the sensor of the invention provides intelligent selection of multiple videos from multiple cameras covering an event at a given time, for example selecting one with least shake. In certain embodiments, the sensor of the invention enables near real-time alteration of camera parameters during an event determined by the motion capture sensor, and alteration of playback parameters and special effects for synchronized event videos. Creates highlight reels filtered by metrics and can sort by metric. In certain embodiments, the sensor of the invention integrates with multiple sensors to save event data even if other sensors do not detect the event. In certain embodiments, the sensor of the invention also enables analysis or comparison of movement associated with the same user, other user, historical user or group of users. At least one embodiment provides intelligent recognition of events within motion data including but not limited to motion capture data obtained from portable wireless motion capture elements such as visual markers and sensors, radio frequency identification tags and mobile device computer systems, or calculated based on analyzed movement associated with the same user, or compared against the user or another other user, historical user or group of users. Enables low memory utilization for event data and video data by trimming motion data and videos to correspond to the detected events. This may be performed on the mobile device or on a remote server and based on location and/or time of the event and based on the location and/or time of the video, and may optionally include the orientation of the camera to further limit the videos that may include the motion events. Embodiments enable event based viewing and low power transmission of events and communication with an app executing on a mobile device and/or with external cameras to designate windows that define the events. Enables recognition of motion events, and designation of events within images or videos, such as a shot, move or swing of a player, a concussion of a player, boxer, rider or driver, or a heat stroke, hypothermia, seizure, asthma attack, epileptic attack or any other sporting or physical motion related event including walking and falling. Events may be correlated with one or more images or video as captured from internal/external camera or cameras or nanny cam, for example to enable saving video of the event, such as the first steps of a child, violent shaking events, sporting events including concussions, or falling events associated with an elderly person. Concussion related events and other events may be monitored for linear acceleration thresholds and/or patterns as well as rotational acceleration and velocity thresholds and/or patterns and/or saved on an event basis and/or transferred over lightweight connectionless protocols or any combination thereof Generates integrated motion metrics using sensor fusion of motion capture sensor data and motion data derived from video analysis.

Embodiments of the invention enable a user to purchase an application or "app" and a motion capture element and immediately utilize the system with their existing mobile computer, e.g., mobile phone. Embodiments of the invention may display motion information to a monitoring user, or user associated with the motion capture element or piece of equipment. Embodiments may also display information based on motion analysis data associated with a user or piece of equipment based on (via a function such as but not limited to a comparison) previously stored motion capture data or motion analysis data associated with the user or piece of equipment or previously stored motion capture data or motion analysis data associated with at least one other user. This enables sophisticated monitoring, compliance, interaction with actual motion capture data or pattern obtained from other user(s), for example to play a virtual game using real motion data obtained from the user with responses generated based thereon using real motion data capture from the user previously or from other users (or equipment). This capability provides for playing against historical players, for example a game of virtual tennis, or playing against an "average" professional sports person, and is unknown in the art until now.

For example, one or more embodiments include at least one motion capture element configured to couple with a user or piece of equipment or mobile device coupled with the user, wherein the at least one motion capture element includes a memory, a sensor configured to capture any combination of values associated with an orientation, position, velocity, acceleration (linear and/or rotational) of the at least one motion capture element, a radio, and a microcontroller coupled with the memory, the sensor and the radio. The microcontroller is configured to collect data that includes sensor values from the sensor, store the data in the memory, analyze the data and recognize an event within the data to determine event data and transmit the event data associated with the event via the radio. Embodiments of the system may also include an application configured to execute on a mobile device wherein the mobile device includes a computer, a wireless communication interface configured to communicate with the radio to obtain the event data associated with the event. The computer is coupled with wireless communication interface wherein the computer executes the application or "app" to configure the computer to receive the event data from the wireless communication interface, analyze the event data to form motion analysis data, store the event data, or the motion analysis data, or both the event data and the motion analysis data, and display information comprising the event data, or the motion analysis data, or both associated with the at least one user on a display.

One or more embodiments include at least one motion capture sensor that is configured to be placed near the user's head wherein the microcontroller is further configured to calculate of a location of impact on the user's head. Embodiments of the at least one motion capture sensor may be configured to be coupled on a hat or cap, within a protective mouthpiece, using any type of mount, enclosure or coupling mechanism. One or more embodiments of the at least one motion capture sensor may be configured to be coupled with a helmet on the user's head and wherein the calculation of the location of impact on the user's head is based on the physical geometry of the user's head and/or helmet. Embodiments may include a temperature sensor coupled with the at least one motion capture sensor or with the microcontroller for example.

Embodiments of the invention may also utilize an isolator configured to surround the at least one motion capture element to approximate physical acceleration dampening of cerebrospinal fluid around the user's brain to minimize translation of linear acceleration and rotational acceleration of the event data to obtain an observed linear acceleration and an observed rotational acceleration of the user's brain. Thus, embodiments may eliminate processing to translate forces or acceleration values or any other values from the helmet based acceleration to the observed brain acceleration values. Therefore, embodiments utilize less power and storage to provide event specific data, which in turn minimizes the amount of data transfer, which yields lower transmission power utilization and even lower total power utilization. Different isolators may be utilized on a football/hockey/lacrosse player's helmet based on the type of padding inherent in the helmet. Other embodiments utilized in sports where helmets are not worn, or occasionally worn may also utilize at least one motion capture sensor on a cap or hat, for example on a baseball player's hat, along with at least one sensor mounted on a batting helmet. Headband mounts may also be utilized in sports where a cap is not utilized, such as soccer to also determine concussions. In one or more embodiments, the isolator utilized on a helmet may remain in the enclosure attached to the helmet and the sensor may be removed and placed on another piece of equipment that does not make use of an isolator that matches the dampening of a user's brain fluids. Embodiments may automatically detect a type of motion and determine the type of equipment that the motion capture sensor is currently attached to, based on characteristic motion patterns associated with certain types of equipment, i.e., surfboard versus baseball bat.

Embodiments of the invention may be configured to obtain/calculate a linear acceleration value or a rotational acceleration value or both. This enables rotational events to be monitored for concussions as well as linear accelerations. Other events may make use of the linear and/or rotational acceleration and/or velocity, for example as compared against patterns or templates to not only switch sensor personalities during an event to alter the capture characteristics dynamically, but also to characterize the type of equipment currently being utilized with the current motion capture sensor. This enables a single motion capture element purchase by a user to instrument multiple pieces of equipment or clothing by enabling the sensor to automatically determine what type of equipment or piece of clothing the sensor is coupled, based on the motion captured by the sensor when compared against characteristic patterns or templates of motion.

Embodiments of the invention may transmit the event data associated with the event using a connectionless broadcast message. In one or more embodiments, depending on the wireless communication employed, broadcast messages may include payloads with a limited amount of data that may be utilized to avoid handshaking and overhead of a connection based protocol. In other embodiments connectionless or connection based protocols may be utilized in any combination.

In one or more embodiments, the computer may access previously stored event data or motion analysis data associated with the user or piece of equipment, for example to determine the number of concussions or falls or other swings, or any other motion event. Embodiments may also present event data associated with the at least one user on a display based on the event data or motion analysis data associated with the user or piece of equipment and the previously stored event data or motion analysis data associated with the user or piece of equipment or with at least one other user or other piece of equipment. This enables comparison of motion events, in number or quantitative value, e.g., the maximum rotational acceleration observed by the user or other users in a particular game or historically. In addition, patterns or templates that define characteristic motion of particular pieces of equipment for typical events may be dynamically updated, for example on a central server or locally, and dynamically updated in motion capture sensors via the wireless interface in one or more embodiments. This enables sensors to improve over time.

Embodiments of the invention may transmit the information to a display on a visual display coupled with the computer or a remote computer, for example over broadcast television or the Internet for example. Embodiments of the display may also be configured to accept sub-event time locations to provide discrete scrolling along the timeline of the whole event. For example a golf swing may include sub-events such as an address, swing back, swing forward, strike, follow through. The system may display time locations for the sub-events and accept user input near the location to assert that the video should start or stop at that point in time, or scroll to or back to that point in time for ease of viewing sub-events for example.

Embodiments of the invention may also include an identifier coupled with the at least one motion capture sensor or the user or the piece of equipment. In one or more embodiments, the identifier may include a team and jersey number or student identifier number or license number or any other identifier that enables relatively unique identification of a particular event from a particular user or piece of equipment. This enables team sports or locations with multiple players or users to be identified with respect to the app that is configured to receive data associated with a particular player or user. One or more embodiments receive the identifier, for example a passive RFID identifier or address or other serial number associated with the player or user and associate the identifier with the event data and motion analysis data.

One or more embodiments of the at least one motion capture element may further include a light emitting element configured to output light if the event occurs. This may be utilized to display a potential, mild or severe level of concussion on the outer portion of the helmet without any required communication to any external device for example. Different colors or flashing intervals may also be utilized to relay information related to the event. Alternatively, or in combination, the at least one motion capture element may further include an audio output element configured to output sound if the event occurs or if the at least one motion capture sensor is out of range of the computer or wherein the computer is configured to display and alert if the at least one motion capture sensor is out of range of the computer, or any combination thereof Embodiments of the sensor may also utilize an LCD that outputs a coded analysis of the current event, for example in a Quick Response (QR) code or bar code for example so that a referee may obtain a snapshot of the analysis code on a mobile device locally, and so that the event is not viewed in a readable form on the sensor or wirelessly transmitted and intercepted by anyone else.

In one or more embodiments, the at least one motion capture element further includes a location determination element coupled with the microcontroller. This may include a GPS (Global Positioning System) device for example. Alternatively, or in combination, the computer may triangulate the location in concert with another computer, or obtain the location from any other triangulation type of receiver, or calculate the location based on images captured via a camera coupled with the computer and known to be oriented in a particular direction, wherein the computer calculates an offset from the mobile device based on the direction and size of objects within the image for example.

In one or more embodiments, the computer is further configured to request at least one image or video that contains the event from at least one camera proximal to the event. This may include a broadcast message requesting video from a particular proximal camera or a camera that is pointing in the direction of the event. In one or more embodiments, the computer is further configured to broadcast a request for camera locations proximal to the event or oriented to view the event, and optionally display the available cameras, or videos therefrom for the time duration around the event of interest. In one or more embodiments, the computer is further configured to display a list of one or more times at which the event has occurred, which enables the user to obtain the desired event video via the computer, and/or to independently request the video from a third party with the desired event times.

In one or more embodiments, the at least one motion capture sensor is coupled with the mobile device and for example uses an internal motion sensor within or coupled with the mobile device. This enables motion capture and event recognition with minimal and ubiquitous hardware, e.g., using a mobile device with a built-in accelerometer. In one or more embodiments, a first mobile device may be coupled with a user recording motion data, while a second mobile device is utilized to record a video of the motion. In one or more embodiments, the user undergoing motion may gesture, e.g., tap N times on the mobile device to indicate that the second user's mobile device should start recording video or stop recording video. Any other gesture may be utilized to communicate event related or motion related indications between mobile devices.

Embodiments of the at least one motion capture sensor may include a temperature sensor, or the microcontroller may otherwise be coupled with a temperature sensor. In these embodiments, the microcontroller is configured to transmit a temperature obtained from the temperature sensor as a temperature event, for example as a potential indication of heat stroke or hypothermia.

Thus embodiments of the invention may recognize any type of motion event, including events related to motion associated with the at least one motion capture sensor coupled with any combination of the user, or the piece of equipment or the mobile device or motion that is indicative of standing, walking, falling, a heat stroke, seizure, violent shaking, a concussion, a collision, abnormal gait, abnormal or non-existent breathing or any combination thereof or any other type of event having a duration of time during with motion occurs.

Embodiments of the invention may utilize data mining on the motion capture data to obtain patterns for users, equipment, or use the motion capture data or events of a given user or other user in particular embodiments of the invention. Data mining relates to discovering new patterns in large databases wherein the patterns are previously unknown. Many methods may be applied to the data to discover new patterns including statistical analysis, neural networks and artificial intelligence for example. Due to the large amount of data, automated data mining may be performed by one or more computers to find unknown patterns in the data. Unknown patterns may include groups of related data, anomalies in the data, dependencies between elements of the data, classifications and functions that model the data with minimal error or any other type of unknown pattern. Displays of data mining results may include displays that summarize newly discovered patterns in a way that is easier for a user to understand than large amounts of pure raw data. One of the results of the data mining process is improved market research reports, product improvement, lead generation and targeted sales. Generally, any type of data that will be subjected to data mining must be cleansed, data mined and the results of which are generally validated. Businesses may increase profits using data mining. Examples of benefits of embodiments of the invention include customer relationship management to highly target individuals based on patterns discovered in the data. In addition, market basket analysis data mining enables identifying products that are purchased or owned by the same individuals and which can be utilized to offer products to users that own one product but who do not own another product that is typically owned by other users.

Other areas of data mining include analyzing large sets of motion data from different users to suggest exercises to improve performance based on performance data from other users. For example if one user has less rotation of the hips during a swing versus the average user, then exercises to improve flexibility or strength may be suggested by the system. In a golf course embodiment, golf course planners may determine over a large amount of users on a golf course which holes should be adjusted in length or difficulty to obtain more discrete values for the average number of shots per hole, or for determining the amount of time between golfers, for example at a certain time of day or for golfers of a certain age. In addition, sports and medical applications of data mining include determining morphological changes in user performance over time, for example versus diet or exercise changes to determine what improves performance the most, or for example what times of the day, temperatures, or other conditions produce swing events that result in the furthest drive or lowest score. Use of motion capture data for a particular user or with respect to other users enables healthcare compliance, for example to ensure a person with diabetes moves a certain amount during the day, and morphological analysis to determine how a user's motion or range of motion has changed over time. Games may be played with motion capture data that enables virtual reality play against historical greats or other users. For example, a person may play against a previous performance of the same person or against the motion capture data of a friend. This allows users to play a game in a historic stadium or venue in a virtual reality environment, but with motion capture data acquired from the user or other users previously for example. Military planners may utilize the motion capture data to determine which soldiers are most fit and therefore eligible for special operations, or which ones should retire, or by coaches to determine when a player should rest based on the concussion events and severity thereof sustained by a player for example and potentially based on a mined time period where other users have increased performance after a concussion related event.

Embodiments of the system perform motion capture and/or display with an application for example that executes on a mobile device that may include a visual display and an optional camera and which is capable of obtaining data from at least one motion capture element such as a visual marker and/or a wireless sensor. The system can also integrate with standalone cameras, or cameras on multiple mobile devices. The system also enables the user to analyze and display the motion capture data in a variety of ways that provide immediate easy to understand graphical information associated with the motion capture data. Motion capture elements utilized in the system intelligently store data for example related to events associated with striking a ball, making a ski turn, jumping, etc., and eliminate false events, and greatly improve memory usage and minimize storage requirements. In addition, the data may be stored for example for more than one event associated with the sporting equipment, for example multiple bat swings or for an entire round of golf or more if necessary at least until the data is downloaded to a mobile device or to the Internet. Data compression of captured data may also be utilized to store more motion capture data in a given amount of memory. Motion capture elements utilized in the system may also be configured to intelligently power down portions of their circuitry to save power, for example power down transceivers until motion is detected of a certain type. Embodiments of the invention may also utilize flexible battery connectors to couple two or more batteries in parallel to increase the time the system may be utilized before replacing the batteries. Motion capture data is generally stored in memory such as a local database or in a network accessible database, any of which enables data mining described above. Any other type of data mining may be performed using embodiments of the invention, including searching for temporal changes of data related to one or more users and or simply searching for data related to a particular user or piece of equipment.

Other embodiments may display information such as music selections or music playlists to be played based on the motion related data. This for example enables a performance to be compared to another user's performance and select the type of music the other user plays, or to compare the performance relative to a threshold that determines what type of music selection to suggest or display.

Embodiments of the invention directed sports for example enable RFID or passive RFID tags to be placed on items that a user moves wherein embodiments of the system keep track of the motion. For example, by placing passive RFID tags on a particular helmet or cap, or protective mouthpiece for boxing, football, soccer or other contact sport, particular dumbbells at a gym, and by wearing motion capture elements such as gloves and with a pre-existing mobile device for example an IPHONE®, embodiments of the invention provide automatic safety compliance or fitness and/or healthcare compliance. This is achieved by keeping track of the motion, and via RFID or passive RFID, the weight that the user is lifting. Embodiments of the invention may thus add the number of repetitions multiplied by the amount of weight indicated by each RFID tag to calculate the number of calories burned by the user. In another example, an RFID tag coupled with a stationary bike, or wherein the stationary bike can mimic the identifier and/or communicate wirelessly to provide performance data and wherein the mobile computer includes an RFID reader, the number of rotations of the user's legs may be counted. Any other use of RFID or passive RFID is in keeping with the spirit of the invention. This enables doctors to remotely determine whether a user has complied with their medical recommendations, or exceeded linear or rotational acceleration indicative of a concussion for example. Embodiments may thus be utilized by users to ensure compliance and by doctors to lower their malpractice insurance rates since they are ensuring that their patients are complying with their recommendations, albeit remotely. Embodiments of the invention do not require RFID tags for medical compliance, but may utilize them. Embodiments of the invention directed at golf also enable golf shots for each club associated with a golfer to be counted through use of an identifier such as RFID tags on each club (or optionally via an identifier associated with motion capture electronics on a golf club or obtained remotely over the radio) and a mobile computer, for example an !PHONE or IWATCH equipped with an RFID reader that concentrates the processing for golf shot counting on the mobile computer instead of on each golf club. Embodiments of the invention may also allow for the measurement of orientation (North/South, and/or two horizontal axes and the vertical axis) and acceleration using an inertial measurement unit, or accelerometers and/or magnetometers, and/or gyroscopes. This is not required for golf shot counting, although one or more embodiments may determine when the golf club has struck a golf ball through vibration analysis for example and then query a golfer whether to count a shot or not. This functionality may be combined with speed or acceleration threshold or range detection for example to determine whether the golf club was travelling within an acceptable speed or range, or acceleration or range for the "hit" to count. Wavelets may also be utilized to compare valid swing signatures to eliminate count shots or eliminate false strikes for example. This range may vary between different clubs, for example a driver speed range may be "greater than 30 mph" while a putter speed range may be "less than 20 mph", any range may be utilized with any club as desired, or the speed range may be ignored for example. Alternatively or in combination, the mobile computer may only query the golfer to count a shot if the golfer is not moving laterally, i.e., in a golf cart or walking, and/or wherein the golfer may have rotated or taken a shot as determined by an orientation or gyroscope sensor coupled with the mobile computer. The position of the stroke may be shown on a map on the mobile computer for example. In addition, GPS receivers with wireless radios may be placed within the tee markers and in the cups to give daily updates of distances and helps with reading putts and greens for example. The golfer may also wear virtual glasses that allow the golfer to see the golf course map, current location, distance to the hole, number of shots on the current hole, total number of shots and any other desired metric. If the user moves a certain distance, as determined by GPS for example, from the shot without counting the shot, the system may prompt the user on whether to count the shot or not. The system does not require a user to initiate a switch on a club to count a shot and does not require LED's or active or battery powered electronics on each club to count shots. The mobile computer may also accept gestures from the user to count a shot or not count a shot so that the golfer does not have to remove any gloves to operate the mobile computer. For embodiments that utilize position/orientation sensors, the system may only count shots when a club is oriented vertically for example when an impact is detected. The apparatus may also include identifiers that enable a specific apparatus to be identified. The identifiers may be a serial number for example. The identifier for example may originate from an RFID tag on each golf club, or optionally may include a serial number or other identifier associated with motion capture elements associated with a golf club. Utilizing this apparatus enables the identification of a specific golfer, specific club and also enables motion capture and/or display with a system that includes a television and/or mobile device having a visual display and an optional camera and capable of obtaining data from at least one motion capture element such as a visual marker and/or a wireless sensor. The system can also integrate with standalone cameras, or cameras on multiple mobile devices. The system also enables the user to analyze and display the motion capture data in a variety of ways that provide immediate and easy to understand graphical information associated with the motion capture data. The apparatus enables the system to also determine how "centered" an impact is with respect to a ball and a piece of equipment, such as a golf club for example. The system also allows for fitting of equipment including shoes, clubs, etc., and immediate purchasing of the equipment even if the equipment requires a custom assemble-to-order request from a vendor. Once the motion capture data, videos or images and shot count indications are obtained by the system, they may be stored locally, for example in a local database or sent over a telephonic or wireless interface to a remote database for example. Once in a database, the various elements including any data associated with the user, such as age, sex, height, weight, address, income or any other related information may be utilized in embodiments of the invention and/or subjected to data mining. One or more embodiments enable users or OEMs for example to pay for access to the data mining capabilities of the system.

For example, embodiments that utilize motion capture elements allow for analyzing the data obtained from the apparatus and enable the presentation of unique displays associated with the user, such as 3D overlays onto images of the body of the user to visually depict the captured motion data. In addition, these embodiments may also utilize active wireless technology such as BLUETOOTH Low Energy for a range of up to 50 meters to communicate with a golfer's mobile computer. Embodiments of the invention also allow for display of queries for counting a stroke for example as a result of receiving a golf club ID, for example via an RFID reader or alternatively via wireless communication using BLUETOOTH or IEEE 802.11 for example. Use of BLUETOOTH Low Energy chips allows for a club to be in sleep mode for up to 3 years with a standard coin cell battery, thus reducing required maintenance. One or more embodiments of the invention may utilize more than one radio, of more than one technology for example. This allows for a level of redundancy that increases robustness of the system. For example, if one radio no longer functions, e.g., the BLUETOOTH radio for example, then the IEEE 802.11 radio may be utilized to transfer data and warn the golfer that one of the radios is not functioning, while still allowing the golfer to record motion data and count shots associated with the particular club. For embodiments of the invention that utilize a mobile device (or more than one mobile device) without camera(s), sensor data may be utilized to generate displays of the captured motion data, while the mobile device may optionally obtain images from other cameras or other mobile devices with cameras. For example, display types that may or may not utilize images of the user may include ratings, calculated data and time line data. Ratings associated with the captured motion can also be displayed to the user in the form of numerical or graphical data with or without a user image, for example an "efficiency" rating.

Other ratings may include linear acceleration and/or rotational acceleration values for the determination of concussions and other events for example. Calculated data, such as a predicted ball flight path data can be calculated and displayed on the mobile device with or without utilizing images of the user's body. Data depicted on a time line can also be displayed with or without images of the user to show the relative peaks of velocity for various parts of the equipment or user's body for example. Images from multiple cameras including multiple mobile devices, for example from a crowd of golf fans, may be combined into a BULLET TIME visual effect characterized by slow motion of the golf swing shown from around the golfer at various angles at normal speed. All analyzed data may be displayed locally, or uploaded to the database along with the motion capture data, images/videos, shot count and location data where it may undergo data mining processes, wherein the system may charge a fee for access to the results for example.

In one or more embodiments, a user may play a golf course or hit tennis balls, or alternatively simply swing to generate motion capture data for example and when wearing virtual reality glasses, see an avatar of another user, whether virtual or real in an augmented reality environment. In other embodiments, the user moves a piece of equipment associated with any sport or simply move the user's own body coupled with motion capture sensors and view a virtual reality environment displayed in virtual reality glasses of the user's movement or movement of a piece of equipment so instrumented. Alternatively or in combination, a virtual reality room or other environment may be utilized to project the virtual reality avatars and motion data. Hence, embodiments of the system may allow a user on a real golf course to play along with another user at a different location that is not actually hitting balls along with a historical player whose motion data has been analyzed or a data mining constructed user based on one or more motion capture data sequences, and utilized by an embodiment of the system to project an avatar of the historical player. Each of the three players may play in turn, as if they were located in the same place.

Motion capture data and/or events can be displayed in many ways, for example tweeted, to a social network during or after motion capture. For example, if a certain amount of exercise or motion is performed, or calories performed, or a new sports power factor maximum has been obtained, the system can automatically tweet the new information to a social network site so that anyone connected to the Internet may be notified. Motion capture data, motion analyses, and videos may be transmitted in one or more embodiments to one or more social media sites, repositories, databases, servers, other computers, viewers, displays, other mobile devices, emergency services, or public agencies. The data uploaded to the Internet, i.e., a remote database or remote server or memory remote to the system may be viewed, analyzed or data mined by any computer that may obtain access to the data. This allows for remote compliance tweeting and/or compliance and/or original equipment manufacturers to determine for a given user what equipment for compliance or sporting equipment for sports related embodiments is working best and/or what equipment to suggest. Data mining also enables suggestions for users to improve their compliance and/or the planning of sports venues, including golf courses based on the data and/or metadata associated with users, such as age, or any other demographics that may be entered into the system. Remote storage of data also enables medical applications such as morphological analysis, range of motion over time, and diabetes prevention and exercise monitoring and compliance applications as stated. Other applications also allow for games that use real motion capture data from other users, or historical players whether alive or dead after analyzing videos of the historical players for example. Virtual reality and augmented virtual reality applications may also utilize the motion capture data or historical motion data. Military personnel such as commanders and/or doctors may utilize the motion and/or images in determine what type of G-forces a person has undergone from an explosion near an Improvised Explosive Device and automatically route the best type of medical aid automatically to the location of the motion capture sensor. One or more embodiments of the system may relay motion capture data over a G-force or velocity threshold, to their commanding officer or nearest medical personnel for example via a wireless communication link. Alternatively, embodiments of the invention may broadcast lightweight connectionless concussion related messages to any mobile devices listening, e.g., a referee's mobile phone to aid in the assistance of the injured player wherein the lightweight message includes an optional team/jersey number and an acceleration related number such as a potential/probable concussion warning or indicator.

In one or more embodiments of the invention, fixed cameras such as at a tennis tournament, football game, baseball game, car or motorcycle race, golf tournament or other sporting event can be utilized with a wireless interface located near the player/equipment having motion capture elements so as to obtain, analyze and display motion capture data. In this embodiment, real-time or near real-time motion data can be displayed on the video for augmented video replays. An increase in the entertainment level is thus created by visually displaying how fast equipment is moving during a shot, for example with rings drawn around a players hips and shoulders. Embodiments of the invention also allow images or videos from other players having mobile devices to be utilized on a mobile device related to another user so that users don't have to switch mobile phones for example. In one embodiment, a video obtained by a first user for a piece of sporting equipment in motion that is not associated with the second user having the video camera equipped mobile phone may automatically transfer the video to the first user for display with motion capture data associated with the first user. Video and images may be uploaded into the database and data mined through image analysis to determine the types/colors of clothing or shoes for example that users are wearing.

Based on the display of data, the user can determine the equipment that fits the best and immediately purchase the equipment, via the mobile device. For example, when deciding between two sets of skis, a user may try out both pairs that are instrumented with motion capture elements wherein the motion capture data is analyzed to determine which pair of skis enables more efficient movement. For golf embodiments, when deciding between two golf clubs, a user can take swings with different clubs and based on the analysis of the captured motion data and quantitatively determine which club performs better. Custom equipment may be ordered through an interface on the mobile device from a vendor that can assemble-to-order customer built equipment and ship the equipment to the user for example. Shaft lengths for putters for example that are a standard length can be custom made for a particular user based on captured motion data as a user putts with an adjustable length shaft for example. Based on data mining of the motion capture data and shot count data and distances for example allows for users having similar swing characteristics to be compared against a current user wherein equipment that delivers longer shots for a given swing velocity for a user of a particular size and age for example may be suggested or searched for by the user to improve performance. OEMs may determine that for given swing speeds, which make and model of club delivers the best overall performance as well. One skilled in the art will recognize that this applies to all activities involving motion, not just golf Embodiments of the system may utilize a variety of sensor types. In one or more embodiments of the invention, active sensors may integrate with a system that permits passive or active visual markers to be utilized to capture motion of particular points on a user's body or equipment. This may be performed in a simply two-dimensional manner or in a three-dimensional manner if the mobile device is configured with two or more cameras, or if multiple cameras or mobile devices are utilized to capture images such as video and share the images in order to create triangulated three-dimensional motion data from a set of two-dimensional images obtained from each camera. Another embodiment of the invention may utilize inertial measurement units (IMU) or any other sensors that can produce any combination of orientation, position, velocity and/or acceleration information to the mobile device. The sensors may thus obtain data that may include any combination of one or more values associated with orientation (vertical or North/South or both), position (either via through Global Positioning System, i.e., "GPS" or through triangulation), velocity (in all three axes), acceleration (in all three axes). All motion capture data obtained from the various sensor types may be saved in a database for analysis, monitoring, compliance, game playing or other use and/or data mining, regardless of the sensor type.

In one or more embodiments of the invention, a sensor may be utilized that includes a passive marker or active marker on an outside surface of the sensor, so that the sensor may also be utilized for visual tracking (either two-dimensional or three dimensional) and for orientation, position, velocity, acceleration, angular velocity, angular acceleration or any other physical quantity produced by the sensor. Visual marker embodiments of the motion capture element(s) may be passive or active, meaning that they may either have a visual portion that is visually trackable or may include a light emitting element such as a light emitting diode (LED) that allows for image tracking in low light conditions. This for example may be implemented with a graphical symbol or colored marker at the end of the shaft near the handle or at the opposing end of the golf club at the head of the club. Images or videos of the markers may be analyzed locally or saved in the database and analyzed and then utilized in data mining. In addition, for concussion related embodiments, the visual marker may emit a light that is indicative of a concussion, for example flashing yellow for a moderate concussion and fast flashing red for a severe concussion or any other visual or optional audio event indicators or both. As previously discussed, an LCD may output a local visual encoded message so that it is not intercepted or otherwise readable by anyone not having a mobile device local and equipped to read the code. This enables sensitive medical messages to only be read by a referee or local medical personnel for a concussion or paralysis related event for example.

Embodiments of the motion capture sensors may be generally mounted on or near one or more end or opposing ends of sporting equipment, for example such as a golf club and/or anywhere in between (for EI measurements) and may integrate with other sensors coupled to equipment, such as weapons, medical equipment, wristbands, shoes, pants, shirts, gloves, clubs, bats, racquets, balls, helmets, caps, mouthpieces, etc., and/or may be attached to a user in any possible manner. For example, a rifle to determine where the rifle was pointing when a recoil was detected by the motion capture sensor. This data may be transmitted to a central server, for example using a mobile computer such as a mobile phone or other device and analyzed for war games practice for example. In addition, one or more embodiments of the sensor can fit into a weight port of a golf club, and/or in the handle end of the golf club. Other embodiments may fit into the handle of, or end of, a tennis racquet or baseball bat for example. Embodiments that are related to safety or health monitoring may be coupled with a cap, helmet, and/or mouthpiece or in any other type of enclosure. One or more embodiments of the invention may also operate with balls that have integrated sensors as well. One or more embodiments of the mobile device may include a small mountable computer such as an !PHONE or !WATCH that may or may not have integrated displays, and which are small enough to mount on a shaft of a piece of sporting equipment and not affect a user's swing. Alternatively, the system may calculate the virtual flight path of a ball that has come in contact with equipment moved by a player. For example with a baseball bat or tennis racquet or golf club having a sensor integrated into a weight port of other portion of the end of the club striking the golf ball and having a second sensor located in the tip of the handle of the golf club, or in one or more gloves worn by the player, an angle of impact can be calculated for the club. By knowing the loft of the face of the club, an angle of flight may be calculated for the golf ball. In addition, by sampling the sensor at the end of the club at a high enough speed to determine oscillations indicative of where on the face of the club the golf ball was struck, a quality of impact may be determined. These types of measurements and the analysis thereof help an athlete improve, and for fitting purposes, allow an athlete to immediately purchase equipment that fits correctly. Centering data may be uploaded to the database and data mined for patterns related to the bats, racquets or clubs with the best centering on average, or the lowest torsion values for example on a manufacturer basis for product improvement. Any other unknown patterns in the data that are discovered may also be presented or suggested to users or search on by users, or paid for, for example by manufacturers or users.

One or more embodiments of the sensor may contain charging features such as mechanical eccentric weight, as utilized in some watches known as "automatic" or "self winding" watches, optionally including a small generator, or inductive charging coils for indirect electromechanical charging of the sensor power supply. Other embodiments may utilize plugs for direct charging of the sensor power supply or electromechanical or microelectromechanical (MEMS) based charging elements. Any other type of power micro-harvesting technologies may be utilized in one or more embodiments of the invention. One or more embodiments of the sensor may utilize power saving features including gestures that power the sensor on or off Such gestures may include motion, physical switches, contact with the sensor, wireless commands to the sensor, for example from a mobile device that is associated with the particular sensors. Other elements that may couple with the sensor includes a battery, low power microcontroller, antenna and radio, heat sync, recharger and overcharge sensor for example. In addition, embodiments of the invention allow for power down of some or all of the components of the system until an electronic signal from accelerometers or a mechanical switch determines that the club has moved for example.

One or more embodiments of the invention enable Elasticity Inertia or EI measurement of sporting equipment and even body parts for example. Placement of embodiments of the sensor along the shaft of a golf club, tennis racquet, baseball bat, hockey stick, shoe, human arm or any other item that is not perfectly stiff enables measurement of the amount of flex at points where sensors are located or between sensors. The angular differences in each sensor over time allow for not only calculation of a flex profile, but also a flex profile that is dependent on time or force. For example, known EI machines use static weights between to support points to determine an EI profile. These machines therefore cannot detect whether the EI profile is dependent upon the force applied or is dependent on the time at which the force is applied, for example EI profiles may be non-linear with respect to force or time. Example materials that are known to have different physical properties with respect to time include Maxwell materials and non-Newtonian fluids.

A user may also view the captured motion data in a graphical form on the display of the mobile device or for example on a set of glasses that contains a video display. The captured motion data obtained from embodiments of the motion capture element may also be utilized to augment a virtual reality display of user in a virtual environment. Virtual reality or augmented reality views of patterns that are found in the database via data mining are also in keeping with the spirit of the invention. User's may also see augmented information such as an aim assist or aim guide that shows for example where a shot should be attempted to be placed for example based on existing wind conditions, or to account for hazards, e.g., trees that are in the way of a desired destination for a ball, i.e., the golf hole for example.

One or more embodiments of the invention include a motion event recognition and video synchronization system that includes at least one motion capture element configured to couple with a user or piece of equipment or mobile device coupled with the user. The at least one motion capture element may include a memory, a sensor configured to capture any combination of values associated with an orientation, position, velocity and acceleration of the at least one motion capture element, a radio, a microcontroller coupled with the memory, the sensor and the radio. The microcontroller may be configured to collect data that includes sensor values from the sensor, store the data in the memory, analyze the data and recognize an event within the data to determine event data, transmit the event data associated with the event via the radio. The system may also include a mobile device that includes a computer, a wireless communication interface configured to communicate with the radio to obtain the event data associated with the event, wherein the computer is coupled with wireless communication interface, wherein the computer is configured to receive the event data from the wireless communication interface. The computer may also analyze the event data to form motion analysis data, store the event data, or the motion analysis data, or both the event data and the motion analysis data, obtain an event start time and an event stop time from the event, request image data from camera that includes a video captured at least during a timespan from the event start time to the event stop time and display an event video on a display that includes both the event data, the motion analysis data or any combination thereof that occurs during the timespan from the event start time to the event stop time and the video captured during the timespan from the event start time to the event stop time.

Embodiments may synchronize clocks in the system using any type of synchronization methodology and in one or more embodiments the computer on the mobile device is further configured to determine a clock difference between the motion capture element and the mobile device and synchronize the motion analysis data with the video. For example, one or more embodiments of the invention provides procedures for multiple recording devices to synchronize information about the time, location, or orientation of each device, so that data recorded about events from different devices can be combined. Such recording devices may be embedded sensors, mobile phones with cameras or microphones, or more generally any devices that can record data relevant to an activity of interest. In one or more embodiments, this synchronization is accomplished by exchanging information between devices so that the devices can agree on a common measurement for time, location, or orientation. For example, a mobile phone and an embedded sensor may exchange messages with the current timestamps of their internal clocks; these messages allow a negotiation to occur wherein the two devices agree on a common time. Such messages may be exchanged periodically as needed to account for clock drift or motion of the devices after a previous synchronization. In other embodiments, multiple recording devices may use a common server or set of servers to obtain standardized measures of time, location, or orientation. For example, devices may use a GPS system to obtain absolute location information for each device. GPS systems may also be used to obtain standardized time. NTP (Network Time Protocol) servers may also be used as standardized time servers. Using servers allows devices to agree on common measurements without necessarily being configured at all times to communicate with one another.

In one or more embodiments of the invention, some of the recording devices are configured to detect the occurrence of various events of interest. Some such events may occur at specific moments in time; others may occur over a time interval, wherein the detection includes detection of the start of an event and of the end of an event. These devices are configured to record any combination of the time, location, or orientation of the recording device along with the event data, using the synchronized measurement bases for time, location, and orientation described above.

Embodiments of the computer on the mobile device may be further configured to discard at least a portion of the video outside of the event start time to the event stop. For example, in one or more embodiments of the invention, some of the recording devices capture data continuously to memory while awaiting the detection of an event. To conserve memory, some devices may be configured to store data to a more permanent local storage medium, or to a server, only when this data is proximate in time to a detected event. For example, in the absence of an event detection, newly recorded data may ultimately overwrite previously recorded data in memory. A circular buffer may be used in some embodiments as a typical implementation of such an overwriting scheme. When an event detection occurs, the recording device may store some configured amount of data prior to the start of the event, and some configured amount of data after the end of the event, in addition to storing the data captured during the event itself Any pre or post time interval is considered part of the event start time and event stop time so that context of the event is shown in the video for example. Saving only the video for the event on the mobile device with camera or camera itself saves tremendous space and drastically reduces upload times.

Embodiments of the system may further comprise a server computer remote to the mobile device and wherein the server computer is configured to discard at least a portion of the video outside of the event start time to the event stop and return the video captured during the timespan from the event start time to the event stop time to the computer in the mobile device.

Embodiments of the at least one motion capture element may be configured to transmit the event to at least one other motion capture sensor or at least one other mobile device or any combination thereof, and wherein the at least one other motion capture sensor or the at least one other mobile device or any combination thereof is configured to save data associated with the event. For example, in embodiments with multiple recording devices operating simultaneously, one such device may detect an event and send a message to other recording devices that such an event detection has occurred. This message can include the timestamp of the start and/or stop of the event, using the synchronized time basis for the clocks of the various devices. The receiving devices, e.g., other motion capture sensors and/or cameras may use the event detection message to store data associated with the event to nonvolatile storage or to a server. The devices may be configured to store some amount of data prior to the start of the event and some amount of data after the end of the event, in addition to the data directly associated with the event. In this way all devices can record data simultaneously, but use an event trigger from only one of the devices to initiate saving of distributed event data from multiple sources.

Embodiments of the computer may be further configured to save the video from the event start time to the event stop time with the motion analysis data that occurs from the event start time to the event stop time or a remote server may be utilized to save the video. In one or more embodiments of the invention, some of the recording devices may not be in direct communication with each other throughout the time period in which events may occur. In these situations, devices can be configured to save complete records of all of the data they have recorded to permanent storage or to a server. Saving of only data associated with events may not be possible in these situations because some devices may not be able to receive event trigger messages. In these situations, saved data can be processed after the fact to extract only the relevant portions associated with one or more detected events. For example, multiple mobile devices may record video of a player or performer, and upload this video continuously to a server for storage. Separately the player or performer may be equipped with an embedded sensor that is able to detect events such as particular motions or actions. Embedded sensor data may be uploaded to the same server either continuously or at a later time. Since all data, including the video streams as well as the embedded sensor data, is generally timestamped, video associated with the events detected by the embedded sensor can be extracted and combined on the server.

Embodiments of the server or computer may be further configured while a communication link is open between the at least one motion capture sensor and the mobile device to discard at least a portion of the video outside of the event start time to the event stop and save the video from the event start time to the event stop time with the motion analysis data that occurs from the event start time to the event stop time. Alternatively, if the communication link is not open, embodiments of the computer may be further configured to save video and after the event is received after the communication link is open, then discard at least a portion of the video outside of the event start time to the event stop and save the video from the event start time to the event stop time with the motion analysis data that occurs from the event start time to the event stop time. For example, in some embodiments of the invention, data may be uploaded to a server as described above, and the location and orientation data associated with each device's data stream may be used to extract data that is relevant to a detected event. For example, a large set of mobile devices may be used to record video at various locations throughout a golf tournament. This video data may be uploaded to a server either continuously or after the tournament. After the tournament, sensor data with event detections may also be uploaded to the same server. Post-processing of these various data streams can identify particular video streams that were recorded in the physical proximity of events that occurred and at the same time. Additional filters may select video streams where a camera was pointing in the correct direction to observe an event. These selected streams may be combined with the sensor data to form an aggregate data stream with multiple video angles showing an event.

The system may obtain video from a camera coupled with the mobile device, or any camera that is separate from or otherwise remote from the mobile device. In one or more embodiments, the video is obtained from a server remote to the mobile device, for example obtained after a query for video at a location and time interval.

Embodiments of the server or computer may be configured to synchronize the video and the event data, or the motion analysis data via image analysis to more accurately determine a start event frame or stop event frame in the video or both, that is most closely associated with the event start time or the event stop time or both. In one or more embodiments of the invention, synchronization of clocks between recording devices may be approximate. It may be desirable to improve the accuracy of synchronizing data feeds from multiple recording devices based on the view of an event from each device. In one or more embodiments, processing of multiple data streams is used to observe signatures of events in the different streams to assist with fine-grained synchronization. For example, an embedded sensor may be synchronized with a mobile device including a video camera, but the time synchronization may be accurate only to within 100 milliseconds. If the video camera is recording video at 30 frames per second, the video frame corresponding to an event detection on the embedded sensor can only be determined within 3 frames based on the synchronized timestamps alone. In one embodiment of the device, video frame image processing can be used to determine the precise frame corresponding most closely to the detected event. For instance, a shock from a snowboard hitting the ground that is detected by an inertial sensor may be correlated with the frame at which the geometric boundary of the snowboard contacts the ground. Other embodiments may use other image processing techniques or other methods of detecting event signatures to improve synchronization of multiple data feeds.

Embodiments of the at least one motion capture element may include a location determination element configured to determine a location that is coupled with the microcontroller and wherein the microcontroller is configured to transmit the location to the computer on the mobile device. In one or more embodiments, the system further includes a server wherein the microcontroller is configured to transmit the location to the server, either directly or via the mobile device, and wherein the computer or server is configured to form the event video from portions of the video based on the location and the event start time and the event stop time. For example, in one or more embodiments, the event video may be trimmed to a particular length of the event, and transcoded to any or video quality, and overlaid or otherwise integrated with motion analysis data or event data, e.g., velocity or acceleration data in any manner. Video may be stored locally in any resolution, depth, or image quality or compression type to store video or any other technique to maximize storage capacity or frame rate or with any compression type to minimize storage, whether a communication link is open or not between the mobile device, at least one motion capture sensor and/or server. In one or more embodiments, the velocity or other motion analysis data may be overlaid or otherwise combined, e.g., on a portion beneath the video, that includes the event start and stop time, that may include any number of seconds before and/or after the actual event to provide video of the swing before a ball strike event for example. In one or more embodiments, the at least one motion capture sensor and/or mobile device(s) may transmit events and video to a server wherein the server may determine that particular videos and sensor data occurred in a particular location at a particular time and construct event videos from several videos and several sensor events. The sensor events may be from one sensor or multiple sensors coupled with a user and/or piece of equipment for example. Thus the system may construct short videos that correspond to the events, which greatly decreases video storage requirements for example.

In one or more embodiments, the microcontroller or the computer is configured to determine a location of the event or the microcontroller and the computer are configured to determine the location of the event and correlate the location, for example by correlating or averaging the location to provide a central point of the event, and/or erroneous location data from initializing GPS sensors may be minimized. In this manner, a group of users with mobile devices may generate videos of a golfer teeing off, wherein the event location of the at least one motion capture device may be utilized and wherein the server may obtain videos from the spectators and generate an event video of the swing and ball strike of the professional golfer, wherein the event video may utilize frames from different cameras to generate a BULLET TIME® video from around the golfer as the golfer swings. The resulting video or videos may be trimmed to the duration of the event, e.g., from the event start time to the event stop time and/or with any pre or post predetermined time values around the event to ensure that the entire event is captured including any setup time and any follow through time for the swing or other event.

In one or more embodiments, the computer on the mobile device may request at least one image or video that contains the event from at least one camera proximal to the event directly by broadcasting a request for any videos taken in the area by any cameras, optionally that may include orientation information related to whether the camera was not only located proximally to the event, but also oriented or otherwise pointing at the event. In other embodiments, the video may be requested by the computer on the mobile device from a remote server. In this scenario, any location and/or time associated with an event may be utilized to return images and/or video near the event or taken at a time near the event, or both. In one or more embodiments, the computer or server may trim the video to correspond to the event duration and again, may utilize image processing techniques to further synchronize portions of an event, such as a ball strike with the corresponding frame in the video that matches the acceleration data corresponding to the ball strike on a piece of equipment for example.

Embodiments of the computer on the mobile device or on the server may be configured to display a list of one or more times at which an event has occurred or wherein one or more events has occurred. In this manner, a user may find events from a list to access the event videos in rapid fashion.

Embodiments of the invention may include at least one motion capture sensor that is physically coupled with the mobile device. These embodiments enable any type of mobile phone or camera system with an integrated sensor, such as any type of helmet mounted camera or any mount that includes both a camera and a motion capture sensor to generate event data and video data.

In some embodiments the system may also include one or more computers with a wireless communication interface that can communicate with the radios of one or more motion capture elements to receive the event data associated with motion events. The computer may receive raw motion data, and it may analyze this data to determine events. In other embodiments the determination of events may occur in the motion capture element, and the computer may receive event data. Combinations of these two approaches are also possible in some embodiments.

In some embodiments the computer or computers may determine the start time and end time of a motion event from the event data. They may then request image data from a camera that has captured video or one or more images for some time interval at least within some portion of the time between this event start time and event end time. The term video in this specification will include individual images as well as continuous video, including the case of a camera that takes a single snapshot image during an event interval. This video data may then be associated with the motion data form a synchronized event video. Events may be gestured by a user by shaking or tapping a motion capture sensor a fixed number of times for example. Any type of predefined event including user gesture events may be utilized to control at least one camera to transfer generally concise event videos without requiring the transfer of huge raw video files.

In some embodiments the request of video from a camera may occur concurrently with the capture or analysis of motion data. In such embodiments the system will obtain or generate a notification that an event has begun, and it will then request that video be streamed from one or more cameras to the computer until the end of the event is detected. In other embodiments the request of video may occur after a camera has uploaded its video records to another computer, such as a server. In this case the computer will request video from the server rather than directly from the camera.

Various techniques may be used to perform synchronization of motion data and video data. Such techniques include clock synchronization methods well-known in the art, such as the network time protocol, that ensure that all devices—motion capture elements, computer, and cameras—use a common time base. In another technique the computer may compare its clock to an internal clock of the motion capture element and to an internal clock of a camera, by exchanging packets containing the current time as registered by each device. Other techniques analyze motion data and video data to align their different time bases for synchronization. For instance a particular video frame showing a contact with a ball may be aligned with a particular data frame from motion data showing a shock in an accelerometer; these frames can then be used effectively as key frames, to synchronize the motion data and the video data. The combined video data and motion data forms a synchronized event video with an integrated record of an event.

In one or more embodiments, a computer configured to receive or process motion data or video data may be a mobile device, including but not limited to a mobile telephone, a smartphone, a tablet, a PDA, a laptop, a notebook, or any other device that can be easily transported or relocated. In other embodiments, such a computer may integrated into a camera, and in particular it may be integrated into the camera from which video data is obtained. In other embodiments, such a computer may be a desktop computer or a server computer, including but not limited to virtual computers running as virtual machines in a data center or in a cloud-based service. In some embodiments, the system may include multiple computers of any of the above types, and these computers may jointly perform the operations described in this specification. As will be obvious to one skilled in the art, such a distributed network of computers can divide tasks in many possible ways and can coordinate their actions to replicate the actions of a single centralized computer if desired. The term computer in this specification is intended to mean any or all of the above types of computers, and to include networks of multiple such computers acting together.

In one or more embodiments, the computer may obtain or create a sequence of synchronized event videos. The computer may display a composite summary of this sequence for a user to review the history of the events. For the videos associated with each event, in some embodiments this summary may include one or more thumbnail images generated from the videos. In other embodiments the summary may include smaller selections from the full event video. The composite summary may also include display of motion analysis or event data associated with each synchronized event video. In some embodiments, the computer may obtain a metric and display the value of this metric for each event. The display of these metric values may vary in different embodiments. In some embodiments the display of metric values may be a bar graph, line graph, or other graphical technique to show absolute or relative values. In other embodiments color-coding or other visual effects may be used. In other embodiments the numerical values of the metrics may be shown. Some embodiments may use combinations of these approaches.

In one or more embodiments, the computer may accept selection criteria for a metric of interest associated with the motion analysis data or event data of the sequence of events. For example, a user may provide criteria such as metrics exceeding a threshold, or inside a range, or outside a range. Any criteria may be used that may be applied to the metric values of the events. In response to the selection criteria, the computer may display only the synchronized event videos or their summaries (such as thumbnails) that meet the selection criteria. As an example, a user capturing golf swing event data may wish to see only those swings with the swing speed above 100 mph.

In some embodiments of the invention, the computer may sort and rank synchronized event videos for display based on the value of a selected metric, in addition to the filtering based on selection criteria as described above. Continuing the example above, the user capturing golf swing data may wish to see only those swings with swing speed above 100 mph, sorted with the highest swing speed shown first.

In one or more embodiments, the computer may generate a highlight reel that combines the video for events that satisfy selection criteria. Such a highlight reel may include the entire video for the selected events, or a portion of the video that corresponds to the important moments in the event as determined by the motion analysis. In some embodiments the highlight reel may include overlays of data or graphics on the video or on selected frames showing the value of metrics from the motion analysis. Such a highlight reel may be generated automatically for a user once the user indicates which events to include by specifying selection criteria. In some embodiments the computer may allow the user to edit the highlight reel to add or remove events, to lengthen or shorten the video shown for each event, to add or remove graphic overlays for motion data, or to add special effects or soundtracks.

In embodiments with multiple cameras, motion data and multiple video streams may be combined into a single synchronized event video. Videos from multiple cameras may provide different angles or views of an event, all synchronized to motion data and to a common time base. In some embodiments one or more videos may be available on one or more computers (such as servers or cloud services) and may be correlated later with event data. In these embodiments a computer may search for stored videos that were in the correct location and orientation to view an event. The computer could then retrieve the appropriate videos and combine them with event data to form a composite view of the event with video from multiple positions and angles.

In some embodiments the computer may select a particular video from the set of possible videos associated with an event. The selected video may be the best or most complete view of the event based on various possible criteria. In some embodiments the computer may use image analysis of each of the videos to determine the best selection. For example, some embodiments may use image analysis to determine which video is most complete in that the equipment or people of interest are least occluded or are most clearly visible. In some embodiments this image analysis may include analysis of the degree of shaking of a camera during the capture of the video, and selection of the video with the most stable images. In some embodiments a user may make the selection of a preferred video, or the user may assist the computer in making the selection by specifying the most important criteria.

In some embodiments event data from a motion capture element may be used to send control messages to a camera that can record video for the event. In embodiments with multiple cameras, control messages could be broadcast or could be send to a set of cameras during the event. These control messages may modify the video recording parameters based on the data associated with the event, including the motion analysis data. For example, a camera may be on standby and not recording while there is no event of interest in progress. A computer may await event data, and once an event starts it may send a command to a camera to begin recording. Once the event has finished, the computer may then send a command to the camera to stop recording. Such techniques can conserve camera power as well as video memory.

More generally in some embodiments a computer may send control messages to a camera or cameras to modify any relevant video recording parameters in response to event data or motion analysis data. These recording parameters may for example include the frame rate, resolution, color depth, color or grayscale, compression method, and compression quality of the video, as well as turning recording on or off. As an example of where this may be useful, motion analysis data may indicate when a user or piece of equipment is moving rapidly; the frame rate of a video recording could be increased during periods of rapid motion in response, and decreased during periods of relatively slow motion. By using a higher frame rate during rapid motion, the user can slow the motion down during playback to observe high motion events in great detail. These techniques can allow cameras to conserve video memory and to use available memory efficiently for events of greatest interest.

In some embodiments, the computer may accept a sound track, for example from a user, and integrate this sound track into the synchronized event video. This integration would for example add an audio sound track during playback of an event video or a highlight reel. Some embodiments may use event data or motion analysis data to integrate the sound track intelligently into the synchronized event video. For example, some embodiments may analyze a sound track to determine the beats of the sound track based for instance on time points of high audio amplitude. The beats of the sound track may then be synchronized with the event using event data or motion analysis data. For example such techniques may automatically speed up or slow down a sound track as the motion of a user or object increases or decreases. These techniques provide a rich media experience with audio and visual cues associated with an event.

In one or more embodiments, a computer is configured to playback a synchronized event video on one or more displays. These displays may be directly attached to the computer, or may be remote on other devices. Using the event data or the motion analysis data, the computer may modify the playback to add or change various effects. These modifications may occur multiple times during playback, or even continuously during playback as the event data changes. For instance, during periods of low motion the playback may occur at normal speed, while during periods of high motion the playback may switch to slow motion to highlight the details of the motion.

Modifications to playback speed may be made based on any observed or calculated characteristics of the event or the motion. For instance, event data may identify particular sub-events of interest, such as the striking of a ball, beginning or end of a jump, or any other interesting moments. The computer may modify the playback speed to slow down playback as the synchronized event video approaches these sub-events. This slowdown could increase continuously to highlight the sub-event in fine detail. Playback could even be stopped at the sub-event and await input from the user to continue. Playback slowdown could also be based on the value of one or more metrics from the motion analysis data or the event data. For example, motion analysis data may indicate the speed of a moving baseball bat or golf club, and playback speed could be adjusted continuously to be slower as the speed of such an object increases. Playback speed could be made very slow near the peak value of such metrics.

In other embodiments, modifications could be made to other playback characteristics not limited to playback speed. For example, the computer could modify any or all of playback speed, image brightness, image colors, image focus, image resolution, flashing special effects, or use of graphic overlays or borders. These modifications could be made based on motion analysis data, event data, sub-events, or any other characteristic of the synchronized event video. As an example, as playback approaches a sub-event of interest, a flashing special effect could be added, and a border could be added around objects of interest in the video such as a ball that is about to be struck by a piece of equipment.

In embodiments that include a sound track, modifications to playback characteristics can include modifications to the playback characteristics of the sound track. For example such modifications may include modifications to the volume, tempo, tone, or audio special effects of the sound track. For instance the volume and tempo of a sound track may be increased as playback approaches a sub-event of interest, to highlight the sub-event and to provide a more dynamic experience for the user watching and listening to the playback.

In one or more embodiments, a computer may use image analysis of a video to generate a metric from an object within the video. This metric may for instance measure some aspect of the motion of the object. Such metrics derived from image analysis may be used in addition to or in conjunction with metrics obtained from motion analysis of data from motion sensors. In some embodiments image analysis may use any of several techniques known in the art to locate the pixels associated with an object of interest. For instance, certain objects may be known to have specific colors, textures, or shapes, and these characteristics can be used to locate the objects in video frames. As an example, a tennis ball may be known to be approximately round, yellow, and of texture associate with the ball's materials. Using these characteristics image analysis can locate a tennis ball in a video frame. Using multiple video frames the approximate speed of the tennis ball could be calculated. For instance, assuming a stationary or almost stationary camera, the location of the tennis ball in three-dimensional space can be estimated based on the ball's location in the video frame and based on its size. The location in the frame gives the projection of the ball's location onto the image plane, and the size provides the depth of the ball relative to the camera. By using the ball's location in multiple frames, and by using the frame rate that gives the time difference between frames, the ball's velocity can be estimated. Vertical leap estimate may be performed near a known size object such as a basketball for example.

In one or more embodiments, the microcontroller coupled to a motion capture element is configured to communicate with other motion capture sensors to coordinate the capture of event data. The microcontroller may transmit a start of event notification to another motion capture sensor to trigger that other sensor to also capture event data. The other sensor may save its data locally for later upload, or it may transmit its event data via an open communication link to a computer while the event occurs. These techniques provide a type of master-slave architecture where one sensor can act as a master and can coordinate a network of slave sensors.

In one or more embodiments, a computer may obtain sensor values from other sensors in addition to motion capture sensors, where these other sensors are proximal to an event and provide other useful data associated with the event. For example, such other sensors may sense various combinations of temperature, humidity, wind, elevation, light, sound and physiological metrics (like a heartbeat). The computer may retrieve these other values and save them along with the event data and the motion analysis data to generate an extended record of the event during the timespan from the event start to the event stop.

One or more embodiments may obtain and process both sensor data and video to analyze the motion of objects and generate motion metrics describing this motion. Embodiments may employ various steps and techniques to align the data from sensors and cameras, both in time and in space. This aligned data may then be analyzed using sensor fusion techniques to combine sensor and video data into consistent and robust motion metrics.

One or more embodiments may obtain descriptions of one or more objects of interest, which may include persons, equipment, or both. They may then obtain video captured from one or more cameras, where the video may contain images of these objects in motion. Some or all of the objects of interest may have motion capture elements attached to them; these motion capture elements generate motion sensor data for the objects. One or more embodiments may then combine these three inputs—object descriptions, video, and sensor data—to generate an integrated motion analysis of the objects. The resulting motion metrics may include for example, without limitation, linear position, linear velocity, linear acceleration, trajectory, orientation, angular velocity, angular acceleration, time of motion, time elapsed between positions, time elapsed between start of motion and arriving at a position, and time of impact.

Video analysis of object motion may include identifying the objects of interest in a set of frames selected from the video for analysis. Object identification may use a set of distinguishing visual characteristics for each object, which allow the embodiment to identify the objects in the selected video frames. These distinguishing visual characteristics may include, for example, without limitation, shape, curvature, size, color, luminance, hue, saturation, texture, and pixel pattern. Some embodiments may search all pixels of all of the selected frames for the objects of interest; some embodiments may instead use various optimizations to search only in selected areas of frames likely to contain the objects of interest.

In one or more embodiments, a camera may be in motion during video capture. In order to analyze motion of the objects in the frames, it may therefore be desirable to distinguish this true object motion from the apparent motion of objects caused by camera motion. One or more embodiments therefore may use techniques to determine the pose (location or orientation) of the camera for each frame. True object motion may then be determined by determining the object pose relative to the camera pose in each frame, and then transforming this object pose to a common coordinate system, using the camera pose for each frame.

One or more embodiments may obtain motion capture data for one or more of the objects of interest from motion capture elements, for example from motion sensors attached to the objects. The motion capture data may then be synchronized with the video frames. Then motion capture data may be combined with video analysis data to form motion metrics for the objects. Embodiments may use various sensor fusion techniques to combine this data from different sources into integrated motion metrics.

One or more embodiments of the method may synchronize video frames and sensor data by finding a signature of the same event in both the video and the sensor data, and aligning the frame containing the video signature with the sensor timestamp of the sensor sample containing the sensor data signature. One or more embodiments may synchronize video frames and sensor data by calculating a motion metric for a selected reference object from both the video frames and the sensor data, and finding a time shift between the video motion metric and the sensor motion metric that best aligns the two motion metric graphs. In some embodiments a maximum clock difference between the sensor data and the video frames may be known in advance; in these embodiments the searches for matching event signatures or for time shifts to align motion metrics may optimized by searching only within the known clock difference.

In one or more embodiments, motion analysis may include finding one or more events of interest. Events may be located in video frames using video signatures, and in sensor data using sensor data signatures. Some activities may trigger one of these signatures erroneously, where the activity is not a true event but instead a false positive. One or more embodiments may combine a video signature and a sensor data signature to filter out false positives; for example, if an activity matches a sensor data signature but does not match the corresponding video signature, the activity can be classified as a false positive. True events may be determined when both the video signature and the sensor data signature are present. One or more embodiments may use multi-stage tests to signal a prospective event, and then use either a video signature or a sensor data signature, or both, to confirm that the prospective event is a valid event.

One or more embodiments may use visual markers as objects of interest, or may use visual markers that are attached to objects or to motion capture elements attached to objects. The patterns of the visual markers may form part of the distinguishing visual characteristics for the objects. The visual markers may be designed to have no rotational symmetries, so that different orientations of the markers can be differentiated using video analysis. The visual markers may also be configured with high visibility color.

One or more embodiments may preprocess the video frames to facilitate searching for objects of interest; preprocessing may include, for example, without limitation, noise removal, flicker removal, smoothing, color space conversion, color or brightness balancing, and shadow removal.

One or more embodiments may use sensors to measure the camera pose for the selected video frames. The measured camera pose may be used to transform object poses to a common coordinate system.

One or more embodiments may determine the pose of an identified object in a frame relative to the camera pose for that frame using one or more of the following techniques: a ray on which the object lies may be determined from the location of object in the frame; the relative distance of the object from the camera may be determined from the apparent size of object in the frame compared to the object's true size; the orientation the object relative to the camera may be determined by calculating a rotation that minimizes the difference between a reference pixel pattern for the object and the pixel pattern for the object in the frame. A reference pixel pattern for an object may be one of the distinguishing visual characteristics for the object, or it may be obtained from the object's appearance in a designated reference frame.

One or more embodiments may create or obtain a physical model of the probable trajectories of one or more objects, and use this physical model to estimate a high probability region within each frame for the location of object. Searching frames for the object may then be optimized by searching within these high probability regions.

In embodiments without camera sensors to determine camera pose, it may be desirable to estimate the camera pose for each frame by aligning each frame with the previous frame to compensate for camera motion. Once each frame is aligned with the previous frame, frame differences between can be calculated to determine high motion regions containing moving objects. Searching frames for objects of interest may then be optimized by searching within these high motion regions.

One or more embodiments may use the following technique to align a frame with the previous frame, to compensate for camera motion. First a frame translation may be determined to minimize the pixel differences between a center region of a frame and the center region of the previous frame after applying the frame translation. Then each frame may be divided into tiles, and a local tile translation may be determined for each tile that minimizes the pixel differences between the tile and the corresponding tile of the previous frame after applying the frame translation and the local tile translation.

One or more embodiments may calculate a time of impact for one or more objects of interest as one of the motion metrics. This time of impact may be calculated by detecting a discontinuity in a motion metric between successive frames. This technique may determine an impact frame, but it may not in some cases be able to determine a precise inter-frame impact time. One or more embodiments may determine a more precise impact time by extrapolating the trajectory of an object forward from the frames prior to impact, extrapolating the trajectory this object backwards from the frames after impact, and calculating the time of intersection these two trajectories as the precise impact time.

In one or more embodiments, there may be a desired trajectory for an object; for example, hitting golf ball so that its trajectory goes into the hole. One or more embodiments may compare this desired trajectory with an observed trajectory, and report the trajectory differences as a motion metric. One or more embodiments may determine the changes in the initial conditions of an object trajectory that would be needed to transform the observed trajectory into the desired trajectory. Initial conditions may for example include the initial speed and orientation of the object. For golf, as an example, initial conditions may include the speed and aim of a golf club head at the time of impact with the golf ball.

One or more embodiments may generate a set of highlight frames or fail frames from a video, where the highlight frames or fail frames include an activity of interest. The activity of interest may be identified with one or more activity signatures; for example, sensor data may be used to determine when certain motion metrics fall within or outside particular ranges that determine activities of interest. As an example, a jump may be determined by scanning accelerometer data to find accelerometer values near zero, which may indicate that an object is in free fall. An epic fail representing a crash may be determined by scanning velocity data looking for a sharp transition between a high velocity and a zero or very low velocity. Highlight or fail frames may also include certain frames before or after an activity of interest. Highlight or fail frames may be transmitted to one or more of a repository, a viewer, a server, a computer, a social media site, a mobile device, a network, and an emergency service. One or more embodiments may overlay highlight or fail frames with data or graphics representing the values of motion metrics. One or more embodiments may send messages to the camera that captured the video instructing the camera to discard portions the video other than the highlight or fail frames.

One or more embodiments may calculate an elapsed time for an activity as a motion metric. The starting time for the activity may for example be determined using motion capture data to detect a signature corresponding to the beginning the activity. The finishing time for the activity may for example be determined using video analysis to detect a signature corresponding to the completion of the activity; for example, a camera positioned at a finish line may detect an object crossing the finish line.

One or more embodiments of the method may create a synchronized event video for an event that synchronizes the video with event data received from motion capture elements. This synchronization may calculate event data or receive event data from the motion capture elements, and obtain an event start time and an event stop time from the event data. It may obtain a video start time and a video stop time associated with the video. It may then create a synchronized event video by associating aligning an event time between the event start time and the event stop time with a video time between the video start time and the video stop time. One or more embodiments may overlay event data onto the synchronized event video. One or more embodiments may command the camera to transfer the synchronized event video to another computer, without transferring a portion of the video outside of time interval between the event start time and the event stop time. One or more embodiments may also command the camera to discard a portion of the video outside of time interval between the event start time and the event stop time.

One or more embodiments may detect and eliminate false positive events by first identifying a prospective event using a first set of criteria, and then determine whether the prospective event is a valid event using a second set of criteria. The first set of criteria may for example include having a first value from motion capture data above a first threshold value, and also having a second value from the motion capture data above a second threshold value within a time window around the sample including the first value. The second set of criteria may for example compare the prospective event to a characteristic signal associated with a typical event, or compare the video during the prospective event with a characteristic image associated with this typical event, or both.

Embodiments of the invention may combine data from multiple sensors, possibly of different types or modalities, that track combinations of players, equipment, and projectiles such as balls. Sensor data may be transmitted to an event analysis and tagging system over wired or wireless communications interfaces. The event analysis and tagging system may include one or more processors that analyze the sensor data. Sensor data may be synchronized to a common time scale, and analyzed for event detection and for generation of metrics describing the event.

Sensors may include for example, without limitation, inertial motion sensors, video cameras, light gates, light curtains, and radars. Inertial motion sensors may include for example accelerometers, gyroscopes, magnetometers, or more generally any sensor that measures one or more of position, orientation, linear or angular velocity, or linear or angular acceleration. Combinations of sensor modalities may be used. For example, an embodiment of the system may track a player using a video camera, track the speed of a ball using a radar, and track a piece of equipment such as a bat using an inertial motion sensor. Another embodiment may for example track a piece of equipment with an inertial motion sensor on the equipment, and track a projectile (such as a ball) using another inertial motion sensor embedded in the projectile.

Sensors may be attached to or may otherwise measure or observe motion of pieces of equipment, including but not limited to sports equipment. Equipment may be worn by, attached to, carried by, or used by one or more players in an event. Equipment tracked by the sensors of the system may include for example, without limitation, a bat, a racquet, a paddle, a golf club, a bow, a gun, a slingshot, a sabre, a quarterstaff, a lacrosse stick, a hockey stick, a field hockey stick, a polo mallet, a croquet mallet, a pool cue, a shuffleboard cue, a glove, a shoe, a belt, a watch, a helmet, a cap, a ski, a snowboard, a skateboard, a surfboard, an ice skate, a sled, a luge, a windsurfing board, a hang glider, a roller skate, a roller blade, a vehicle, a snowmobile, a jet ski, a bicycle, a tricycle, a unicycle, a motorcycle, a snowmobile, and a mechanical bull.

Some sporting events or other activities involve projectiles such as balls. Projectiles may be thrown by, caught by, carried by, kicked by, or struck by players. In some activities players may use equipment to hit, catch, or carry a projectile. Projectiles tracked by the sensors of the system may include for example, without limitation, a ball, a football, a rugby ball, an Australian rules football, a soccer ball, a volleyball, a water polo ball, a polo ball, a basketball, a lacrosse ball, a field hockey ball, a croquet ball, a billiard ball, a horseshoe, a shuffleboard disc, a tennis ball, a ping pong ball, a racquet ball, a hand ball, a bocce ball, a lawn dart, a squash ball, a shuttlecock, a baseball, a softball, a golf ball, a bowling ball, a hockey puck, a dodgeball, a kick ball, a Wiffle™ ball, a javelin, a shot put, a discus, a marble, a bullet, an arrow, a knife, a throwing star, a bolas, a grenade, a water balloon, a boomerang, a Frisbee, a caber, and a curling stone.

In many sports a player swings a piece of equipment in attempt to hit or otherwise contact a projectile. Examples include bats hitting baseballs, tennis rackets hitting tennis balls, and polo mallets hitting polo balls. Embodiments of the invention may measure a swing event by combining information on the motion of the projectile and the motion of the equipment hitting (or attempting to hit) the projectile. For example, in baseball or softball, one or more embodiments may combine sensor data on bat motion and sensor data on ball motion to calculate a reaction time metric, which may be defined for example as the elapsed time between a ball leaving a pitcher and the start of a forward swing of a bat to hit the ball.

One or more embodiments may analyze a swing event by calculating a trajectory over time of the projectile and a trajectory over time of the equipment as it hits or attempts to hit the projectile. The equipment trajectory may for example track the location over time of a preferred hitting location on the equipment, such as the sweet spot of a bat for example. Metrics may be calculated by analyzing the combination of the equipment and projectile trajectories. For example, one or more embodiments may first calculate a point on the projectile trajectory that represents an optimal hitting point. A projectile may reach this point at a particular point in time, which is the optimal hitting time. A swing accuracy metric may then be derived from the vector difference between the optimal hitting location and the location on the equipment trajectory at the optimal hitting time. A poor swing may be due to either spatial deviation (the swing did not go to the right location) or temporal deviation (the swing arrived at the right location, but too early or too late). One or more embodiments may calculate a spatial deviation metric derived from the vector difference between the optimal hitting location and the closest point on the equipment trajectory to this optimal hitting location. A temporal deviation metric may be derived from the difference in time between the optimal hitting time and the time that the equipment trajectory reached this closest approach point to the optimal hitting location.

Embodiments of the invention may automatically generate or select one more tags for events, based for example on analysis of sensor data. Event data with tags may be stored in an event database for subsequent retrieval and analysis. Tags may represent for example, without limitation, activity types, players, timestamps, stages of an activity, performance levels, or scoring results.

One or more embodiments may also analyze media such as text, audio, images, or videos from social media sites or other servers to generate, modify, or confirm event tags. Media analyzed may include for example, without limitation, email messages, voice calls, voicemails, audio recordings, video calls, video messages, video recordings, text messages, chat messages, postings on social media sites, postings on blogs, or postings on wilds. Sources of media for analysis may include for example, without limitation, an email server, a social media site, a photo sharing site, a video sharing site, a blog, a wiki, a database, a newsgroup, an RSS server, a multimedia repository, a document repository, and a text message server. Analysis may include searching of text for key words and phrases related to an event. Event tags and other event data may be published to social media sites or to other servers or information systems.

In one or more embodiments, sensor or video data may be collected over long periods of time, where only certain portions of those time periods contain interesting activities. One or more embodiments may therefore receive signatures of activities of interest, and use these signatures to filter the sensor and video data to focus on those activities of interest. For example, in one or more embodiments, a set of highlight frames may be selected from a video that show specifically the activities of interest.

In this illustrative example, one activity of interest is a jump at high speed. The signature for a jump is that the magnitude of the acceleration drops below g/2, indicating that the snowboard is in free fall, and that the magnitude of the velocity is above 50 mph. Acceleration magnitude received from sensor is compared to the acceleration threshold value over time. The accelerometer is integrated (along with data from other inertial sensors such as a gyro) to form velocity data. The acceleration magnitude drops below the threshold at frame 4103 because the snowboarder makes a small jump; however the velocity at that time is not sufficiently fast to match the activity signature. The acceleration magnitude drops again below the threshold at time corresponding to video frame; at this time the velocity also exceeds the required threshold, so the data matches the activity signature. Three highlight video frames are selected to show the jump activity that was detected by comparing the acceleration motion metric to the threshold. One or more embodiments may select highlight frames during an activity of interest that include all of the frames captured during the activity time period. One or more embodiments may add additional frames to the highlight frames that are before or after the activity time period. One or more embodiments may sample only selected frames during the activity time period, for example to generate a small set of highlight images rather than a complete video.

In one or more embodiments that generate highlight frames, consumers of highlight frames may include for example, without limitation: any video or image viewing device; repositories for video, images, or data; a computer of any type, such as a server, desktop, laptop, or tablet; any mobile device such as a phone; a social media site; any network; and an emergency service. An example of an embodiment that may send video highlights to an emergency service is a crash detection system, for example for a bicycle or a motorcycle. This embodiment may monitor a user using for example an accelerometer to detect a crash, and an onboard camera to capture video continuously. When a crash is detected, information about the location and severity of the crash may be sent directly to an emergency service, along with video showing the crash. Any cameras local to the event, whether a highlight event or crash or any other type of event may be queried to determine if they have video from that location and time, for example using a field of view that would envelope the location of the event for example. The videos that cover the event, or any other sensors near the event and near the time may also be queried and sent out to define a group event. Other sensor data, including heart rate and sound or sound levels may also be indicative of an event that is worthy of a highlight or other type of event, such as a fail. Members of any group associated with the user may subscribe to the event or group event and obtain the highlights or fails of the day.

In another embodiment, the invention encompasses a kinetic link comprising a chain of interdependent components of motion acting towards a common goal, the effective and efficient execution of the motion. This kinetic link principle is applicable to all dynamic, athletic-type body motions intended to perform work or convert or transfer energy in any manner by means of bodily exertion, with or without the use of a hand or foot actuated or operated tool or article of sporting equipment. For example, in a golf swing motion, the process of striking a golf ball with a golf club, the kinetic link is composed of four principle components of the motion with three links. These four components and three links in combination represent the full motion of the body. The components consist of the hip segment, shoulder segment, arm segment and the club. The links include the musculature found between each body segment. Since the frame of reference and the point from which this type of motion must be leveraged is the ground itself, a complete analysis of the motion must consider the feet first, then overall posture, then hips, then shoulders, then arms, then club, and finally the ball. A weakness at any point in the kinetic link results in a less than optimal total performance. Means of identifying and improving the component parts of the motion will improve the overall performance. This assumption is at the foundation of the present invention.

The invention, in the broadest sense, may be a global, knowledge-based, enterprise system and method for providing performance testing and training regimes to persons for whom athletic activities such as golfing and others for whom repetitive athletic motions are an inherent part of their normal work or recreational activities, for improving the effectiveness of their golf swing or other specific athletic motion.

A typical example of the system and method uses state of the art technology and equipment for instrumenting a user or subject and monitoring a motion, draws upon and contributes to a vast library of performance data for analysis of the test results, provides an information rich, graphic display of the results in multiple, synchronized formats for user viewing and/or monitoring by a coach or system operator, and based on the results prescribes a user-specific training regime with exercises selected from a library of standardized exercises using standardized tools and training aids.

Users and their coaches may access the library of performance data to see and compare a user's most recent test performance to its own or other test subject's prior test results. After an appropriate amount of off-line exercising, and/or at the desire of the user or coach, the testing is repeated. The specifics of the prescribed training are re-calculated and may include a weighted consideration of the current performance testing result in addition to prior test results. The performance reports provide an objective record of the type and degree of changes in performance that the user has experienced.

The system may be employed during live practice sessions to provide essentially instant or "real time" visual and/or auditory biofeedback, or provide "replay" presentations, of each successive attempt at a particular drill or a full motion. Deviations in specific parameters from the objectives of the prescribed drills are reported and the user has the immediate opportunity to respond to the feedback and reduce the deviation of the specific parameter during an immediate next attempt at the same drill.

In one embodiment, the invention is a local system or method for golf swing motion analysis of a golfer, intended to improve the golfer's performance by repetitive use. The invention includes the use of multiple body and/or tool mounted sensors, wired or wireless transmission of sensor data in real time to a receiver/computer and database system for data processing and analysis, along with a video and/or audio recording input of the test. Results are instantly generated by the system, consisting of associated forms of biofeedback including graphical representations of coordinated and comparative data output on components of the full motion, along with animations of the motion generated from the motion data, and actual video of the motion. The three forms of feedback are combined in their presentation for ready assimilation and understanding by the golfer and/or instructor in either an immediate form to enable sequential, monitored attempts with intermediate feedback, or a later feedback mode with an extended period for practice of prescribed drills intended to improve aspects of the motion.

The analysis reduces the full motion to predetermined major component motions. The coordinated data output portion of the results may represent the relative timing and amplitude of components of the user's own motion. The comparative data output may represent a comparison of the relative timing and amplitude of components of the user's motion to the same components of an expert or other standard performance data from the system database, or the user's own prior test performance data. The data processing and biofeedback may further include prescriptions from a database of standard exercises, tailored according to the user's level of performance and time available, for training on a component-of-motion basis, such as stance, balance, hip motion, and shoulder and arm motion, adjusted according to the user's actual performance data. The exercises may prescribe or presume the use of specialized tools and training aids from among a library of pre-determined tools and training aids, during the exercises.

As described above, the data input, analysis, and the biofeedback report is preferably augmented by use of video, audio, and other recording devices emplaced and focused to capture additional motion data at a desired direction from the user under test, and processed to provide additional graphical, video, audio or other form of output that can be integrated with the data output for optimal user understanding and assimilation of the analysis and report.

The system and method in local or global embodiments may be applied to other athletic or occupational motions by which energy is transformed through user motion into work of any type, for improving performance, preventing injury and/or providing a rehabilitation program.

A sensor device of the invention is attachable to the user's body, and/or motion tool or device such as a golf club, optionally at strategic points. The motion sensor contains a multi-element sensing system and circuitry for sensing and reporting three dimensional position and attitude of the sensor, transmitting a real time output of vector data for further application-specific processing. One embodiment of the multi-element sensing system within the motion sensor includes three gyroscopic inertial sensors, three accelerometers, and three magnetometers, as is produced by InterSense Inc., of Bedford, Mass. Motion data is typically updated at a rate of 120 Hertz from a system employing three motion sensors, although systems with fewer and more motion sensors and with faster and slower position update rates are within the scope of the invention.

The vector data from the full set of motion sensors is sufficient data from which to derive and characterize the principle components of a golf swing or other athletic motion, as is further described below. The information is transmitted in near real time directly from each sensor individually, or via a common transmitter to which some or all the sensors may be hard wired, to a nearby receiver and hence to a processing computer for application-specific data processing and analysis, and generation of data and graphical output reports representing the user's performance, as is further described below.

The processing computer can perform relational calculations on the data received from the various sensors, thereby allowing computation of various application-related parameters of interest. As an example, the processing computer with its golf-specific software can calculate club-face angle or the angle through which the golfer turns his or her shoulders while swinging the golf club. Such parameters are referred to here as "performance parameters."

In a golf swing motion analysis system in particular, inertial sensor data is typically processed into the following parameters relating to the golfer's body performance: hip velocity (degrees per second); hip rotation (degrees negative and positive); shoulder velocity (degrees per second); shoulder rotation (degrees negative and positive); club release (degrees per second); club speed (miles per hour); club face rotation (degrees open/closed); club path (degrees inside or outside of club's address position); hip linear movement (centimeters left or right of neutral address); hip shoulder separation (time difference between maximum hip, shoulder, and club velocity); flexion/extension of hip segment (centimeters traveled along z-axis); and kinetic link. These parameters are further extrapolated to yield a predicted "ball in flight" resulting performance of parameters: spin (degrees per second); launch angle (degrees); carry distance; roll distance (yards); total distance (yards); distance traveled off line (yards right or left); ball flight character (fade, draw, hook, slice, push, pull, straight); and PTI or power transfer index.

The processing computer can also display information about the swing that will allow the golfer or his instructor to visualize and adjust the swing. For example, in one aspect, the system displays live video feed of the golfer (obtained through a video feed from a video camera critically positioned adjacent to the golfer and coupled wirelessly or otherwise to the processing computer), an animated simplification of the same motion generated from motion data, and statistics reporting the state of the various parameters in any given freeze-frame. The system can also display the results of the various calculations of performance parameters, as described in the previous paragraph, which characterize the swing over time; for example, the system can display data regarding the club-face angle or the angle through which the shoulders rotate during a particular swing.

A system interface between the processing computer and the golfer in the form of a control or feedback module mounted on or near the instrumented golfer can provide instructions to the golfer in preparation for or in response to a particular attempted golf swing. The system interface may instruct the golfer, for example, to address the ball, give a five-second window for the golfer to initiate a swing, etc. Such instructions may in one embodiment be in the form of audible beeps, or synthetic speech or pre-recorded voice commands. Colored lamps or a backlit LCD or other type visual signal display can also issue coded or alphanumeric instructions. Such functions are useful in securing specific and timely inputs needed to calibrate the sensors for absolute position, as well as to coordinate the orderly sequencing or progress of a testing session.

In one response mode, the system can be characterized as operating in a "biofeedback mode," where the processing computer through the system interface assists the golfer in following prescribed exercises (described in more detail below). In that mode, the processing computer can also display on its display unit or screen, to the golfer and/or his instructor, one or more calculated performance parameters and video images of the golfer. Calculated diagnostic parameters of interest can be reported on the screen, stored for later analysis, or converted into success or failure codes, which can be transmitted back to the golfer and/or his instructor, or any combination of those actions.

Codes transmitted as biofeedback to the golfer may be in the form of a tone or a color that differs between a successful swing and an unsuccessful swing. For example, if the system is programmed and set up for training the golfer in a set of exercises where the golfer tries to rotate the shoulders through exactly 40 degrees from vertical, the system, as through a control module, can alert the golfer through tones or lights or changing colors within the graphic display screen when the swing differs from the ideal rotation angle by more than a predetermined error. For example, only if the rotation angle falls between 35-45 degrees, will the swing be considered a success. The tones or changing lights may have several bands or ranges, allowing intermediate or scaled results. For example, a red light might follow a swing in which a diagnostic parameter badly diverged from ideal, a yellow light might follow a swing in which the same diagnostic parameter only somewhat diverged from ideal, and a green light might follow a swing in which the same diagnostic parameter diverged from ideal by less than the pre-assigned margin of error. The signal light may be the background color of an animation. The information conveyed by the changing color of the selected illuminated portion of a screen may be likewise presented with same or more or less detail in other audio, textual, numerical and/or graphical formats, including numbers, bar graphs, line graphs and text messages. Oral callouts may be used in combination or in the alternative.

The feedback report may also be continuous or highly differentiated; for example, the length of an audible tone might correspond to the extent to which the diagnostic parameter diverged from ideal, and the golfer is instructed to practice until the tone shortens or disappears. The number of blinks of a light, light color, sound frequency, sound volume, tone length, and tone type are among the characteristics that can be used in the feedback mode. The audio format feedback information can be produced with synthesized voice output from a speaker or earphones.

The processing computer and system interface also can include monitoring by a golf professional or other motion expert or instructor, directly or remotely as through an internet connection, and allow him or her to transmit to the golfer instructions to initiate, cease, or control exercises through instructor command inputs to the system, or received by the system from a remote location, such as through an internet connection.

After computation of the various golf-related parameters of interest, those diagnostic parameters can be utilized by indexing a cross reference table of test results and exercises to automatically prescribe to the golfer an assignment of appropriate individualized exercises to improve his or her swing. In a one embodiment, each calculated diagnostic parameter is divided into two, three, or more ranges, with each range corresponding to a prescribed action with respect to a particular exercise. For example, a first range for a particular diagnostic parameter can result in a prescription of a certain exercise, a second range of the same parameter can result in a different prescription, and a third range of the same parameter can result in no prescribed exercise because the golfer does not have a problem with the particular aspect of the swing that the parameter measures. The different prescription in each example can be, for example, a specific different number of repetitions of a given exercise, a different priority level given to a given exercise (see next paragraph for priority levels), a different exercise tool or accessory being used for a given exercise, or an entirely different exercise. Further, the frequency and duration of the exercises may be apportioned by the prescription compiler in accordance with the golfer's available time and schedule, as it was previously inputted to the system by the golfer.

Alternatively, the prescriptions may result from combinations of results from two or more diagnostic parameters. In variations, the knowledge base may include rules developed through expert interviews, automated analysis techniques based on measured results produced by the swing, or principles of fuzzy logic. In one embodiment, the diagnostic parameters produce exercise prescriptions with assigned priority levels. For example, if a particular golfer's swing produces one diagnostic parameter that is very far from ideal while other diagnostic parameters diverge from ideal only partly, the first diagnostic parameter will be assigned a higher priority level than the others. For another example, if two diagnostic parameters diverge from ideal but one is considered more important to a good golf swing or alternatively one is considered important to control to provide a good foundation for the other, then that one will be assigned a higher priority level than the other.

In one embodiment, each prescribed training exercise is assigned a priority level from one to nine, and several exercises may be assigned a common priority level. In that embodiment, the golfer or the instructor can indicate by input to the computer how much time the golfer has available to perform the exercises, and based on that information, the system can recommend which ones to perform. For example, if an athletic motion analysis system projects a need for three exercises with a priority level of one, five exercises given priority level two, and four other exercises with higher priorities, and if each exercise has been determined to require at least fifteen minutes to perform for reasonable effectiveness, and the golfer has a limited time for exercise, then the system might assign or prescribe accordingly. As specific examples, if the golfer indicates that he has one hour available, the assignment may be performing only the three priority one exercises for twenty minutes each. If the golfer has two hours available, the system might prescribe performing all priority one and all priority two exercises for fifteen minutes each. If the golfer has three hours available, the system might assign all exercises for fifteen minutes each. The minimum times to perform each different exercise might vary, the time recommended to perform any particular exercise might vary or be fixed, and the gradations of priority can be changed as desired.

The diagnostic parameters can also or alternatively be used to prescribe, select or fit golf equipment to the golfer, such as golf clubs or golf shoes from among one of several types or customized versions having particular measured parameters. For example, the length, lie angle, loft, or weight of a particular type of golf club can be selected based on analysis of the diagnostic parameters calculated for the golfer, preferably in combination with parameters about the golfer, such as his or her height, hand length, and foot size.

In another aspect, parameters calculated at time of impact, such as position and orientation of the club face relative to the ball and velocity vector and face angle of the club, can be used to predict the forces on the ball and thus predict its trajectory. Knowledge of the terrain can allow determination of the distance and path of the struck golf ball, or alternatively the calculation can predict distance assuming the terrain is flat. Such predictions based purely on force calculations can be supplemented with information about the behavior of the ball in atmosphere, such as through testing of particular types of golf balls, to adjust for air resistance. In a further variation, wind direction and velocity can be considered, with such data input into the system manually or through an electronic anemometer or local air data station coupled to the system electrically, or via an internet or wireless connection.

The system may be remotely or locally controlled so that an off-site or on-site instructor may direct the operation of the system or monitor the results. In a purely user contained mode, control inputs for set up and testing operations may be entered, test exercises performed, and swing data viewed and reviewed by a user with the aid of a personal control module and data monitoring system such as a belt-worn control/display unit or module.

The methodology and the system are applicable to other repetitive athletic and occupational motions for testing of animals or humans, analysis, reporting, diagnostic review by coaches, trainers and/or medical personnel or physical therapists, with prescriptions being similarly generated for training to improve performance, prevent injury, or for rehabilitation of various motion capabilities where the motion is susceptible of data collection and reduction into component parts in the manner described above, and the report can be presented in a synchronized, composite display of animation, multiple data tracks and video format.

It is an additional goal that the report and the prescribed regime of practice drills can be taken home as a recording in any useful format, or accessed from home through a browser-based, on-line access point connecting to the local system or to a host, knowledge-based enterprise system to which it is connected, for later review and practice.

Therefore, the invention in one aspect consists of a method and apparatus for analysis and improvement of a selected athletic motion of an individual, consisting the steps of using a computer-based motion analysis system that has a processing computer, inertial sensors, a video camera which may be of any analog or digital technology, and a computer-driven display screen; testing an individual doing the athletic motion, with a tool if a tool is implied, by monitoring the execution of the motion with multiple inertial sensors mounted on the individual and optionally on the tool, with the video camera or cameras directed at the individual in action. The athletic motion might be golf, baseball, hammering, sawing, throwing or using other handheld tools or sports equipment, a small sampling of which may include balls, bats, rackets, clubs, paddles, oars, spears, hammers, screwdrivers, staple guns, darts, horseshoes, and axes and others. It extends to running, kicking, jumping, pedaling and other foot/leg athletic motions using foot actuated tools and sports equipment including bicycles, balls, and foot-operated levers and other tools and objects.

The video camera, when used, is carefully positioned in advance to insure precise alignment with the individual under test and useful points of reference for measurement and analysis of the motion. The sensors are carefully positioned with the use of body wearable appliances to insure that sensor data will reflect body motion accurately. Sensor data is collected from the sensors and video signal from the camera during the execution of the athletic motion; and the sensor data is analyzed by processing the sensor data into motion data representing pre-defined selected performance parameters of pre-defined selected components of the athletic motion as may be accomplished by or attributable to specific or distinctive body segments such as the leg, hip, shoulder, neck, head, arm and hand aspects of a motion. The results of the analyzing is reported or presented in a form that includes a real time, computer generated display of multiple, selectable configurations, one of which includes in a composite, synchronized combination of the video signal as a video display, a multi-color, three dimensional animation representing the motion of at least one color-coded body segment created from the motion data, and a time-based graph of multiple selected performance parameters.

There may be provision for setting a range of motion limit for selected components of motion such as a specific bending or flexing component of the motion in advance of the testing. The animation of the motion may incorporate a three dimensional wire mesh cage or open frame representing the motion limits within which the body segment is visible. The software may provide for altering a selected color within the display upon the occurrence of a motion exceeding the motion limits, as a highly visible, instant signal to the individual that the limit has been reached or exceeded. Stepped levels of indication of approaching or exceeding pre-set limits may be used by using multiple color changes such as from green to orange to red.

The analysis may include for selected parameters comparing the motion data test value to a pre-defined benchmark value for the same parameter and determining a degree of deviation, and presenting on a time-based graph the test value and the benchmark value concurrently. The analysis may include calculating from the test values and the benchmark values a score for each selected parameter. It may further include combining the scores of the selected parameters by a pre-defined formula so as to yield a single score representing the total performance value of the athletic motion as a kinetic index.

The system and software may include with or follow the report or presentation with a prescription of a regime of training exercises selected from a pre-defined list of exercises based on the amount of the deviation from the benchmark values of individual parameters, and the exercises may be associated with a pre-defined list of training tools. The frequency and length of periods of exercise may be limited by the available training time of the individual, as may have been entered into the processing computer ahead of the testing.

The wireless inertial sensors may employ a stacked topology within a sensor enclosure wherein a battery is proximate to and its shape conforms to the bottom of the enclosure, and sensor elements and electronic circuitry are positioned over the battery within the enclosure. The sensors may be attached to body appliances that are worn by the individual.

The sensors and the appliances may have correspondingly keyed mating structural by which the sensors are uniformly and repeatably attachable to the same place with the same orientation on the appliances.

The results of the analyzing, including the motion data and the video data, may be stored in a local or remote computer database and made available for later replay locally or via a remote computer or computer network connected or connectible to the processing computer.

The camera may be set up in advance of testing using a reference target or frame placed on the test site so as to define at least one point or line of reference relative to the motion to be tested. The software may be configured for overlaying the video display during a calibration phase with reference points, lines or other symbols relating to aspects of the motion, such as alignment lines, center lines, balance points of the starting, ending or in-motion positions of the test subject, which motion can be more critically observed. The effectiveness of the lines and symbols overlaid on the video display may be dependent on correct camera placement prior to testing.

The particular implementations shown and described are illustrative of the invention and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The invention claimed is:

1. A method for matching a subject with athletic equipment comprising:
   a motion detecting system comprising:
      a. a micro-controller processor;
      b. at least one acceleration sensor;
      c. at least one gyrometric sensor;
      d. a data acquiring unit,
   wherein the motion detecting system collects data to allow determination of torque, force, and sonification, and
   wherein the data acquiring unit calculates information related to said data to create a torque curve of actual torque of a subject and to calculate a deviation from the actual torque and an idealized torque curve of the motion of a subject and based on the calculated deviation, creating a torque curve comparison to determine one or more values and matching said values with mechanical properties of the athletic equipment to match the subject to an optimal athletic equipment for the subject.

2. The method of claim 1, wherein the athletic equipment is a golf club.

3. The method of claim 2, further comprising
   calculating a motion direction of a ball hitting surface of the golf club and an impact posture of the ball hitting surface at the time of actual impact; and
   calculating an incident angle of the ball hitting surface at the time of actual impact based on the movement direction and the impact posture of the ball hitting surface at the time of actual impact.

4. The method according to claim 3, wherein the processor is programmed to obtain a face vector indicating the initial impact posture of the ball hitting surface at a time starting a swing.

5. The method according to claim 2, wherein the processor calculates a movement direction vector of a ball hitting surface of the golf club at a time of starting the swing based on an obtained face vector.

6. The method according to claim 2, wherein the processor is programmed to:
   obtain a first relationship between a movement direction of a ball hitting surface of the golf club at a time of starting a swing and an impact position of a ball hitting a surface of the golf club at the timing of the actual impact; and
   obtain a second relationship between a position of the golf club before starting the swing and the movement direction of the golf club at the time of starting the swing based on output received from the motion detecting system.

7. The method according to claim 6, wherein the processor is further programmed to: output data indicating at least one of the first relationship and the second relationship.

8. The method according to claim 7, wherein the processor is further programmed to control a display to display data indicating a combination of the first relationship and the second relationship as a two-dimensional graph.

9. The method according to claim 7, wherein the processor is further programmed to control a display to display a map including an area that is divided in accordance with a projectile line and a two-dimensional graph.

10. The method according to claim 7, wherein the processor is further programmed to control a display to display a plurality of data points regarding a plurality of swings at a plurality of times with a two-dimensional graph and to distinguish new data from old data that is not new on the two-dimensional graph.

11. The method of claim 1, wherein the motion detecting system is programmed to determine a user swing profile comprising:
   calculating an initial position of the motion detecting system at a time of starting a motion based on at least two of measured speed, time, torque, video, and sonification data received from the motion detecting system; and
   detecting force of actual impact.

12. The method of claim 11, further comprising collecting motion data.

13. The method of claim 12, wherein the motion data is collected from a video device or camera.

14. The method according to claim 1, wherein output received from the motion detecting system is used for determining a posture of a golf club at a time of actual impact during a swing motion is received at a time of actual impact, a time before the time of actual impact, or a time after the time of actual impact.

15. The method of claim 1, wherein the system further comprises a camera, wherein the camera captures video of a subject's motion.

16. The method of claim 15, wherein the video broadcasts a subject's motion for defining the time and speed signature of the subject and graphical expressing output as a graphic or sonification.

17. The method of claim 1, wherein the at least one acceleration sensor is an inertial acceleration sensor.

18. The method of claim 1, wherein the micro-controller processor is compatible with Bluetooth low energy (BLE).

19. The method of claim 1, further comprising collecting speed, time, or video data from the motion detecting system.

20. The method of claim 1, further comprising collecting at least one video stream of data.

21. The method of claim 1, further comprising a Doppler radar sensor.

* * * * *